US012686836B2

(12) United States Patent
Sun et al.

(10) Patent No.: US 12,686,836 B2
(45) **Date of Patent: *Jul. 21, 2026**

(54) SOLID FAST DRAINING/DRYING RINSE AID FOR HIGH TOTAL DISSOLVED SOLID WATER CONDITIONS

(71) Applicant: ECOLAB USA INC., Saint Paul, MN (US)

(72) Inventors: Xin Sun, Eagan, MN (US); Derrick Anderson, Vadnais Heights, MN (US); Kelsey West, Saint Paul, MN (US); Janel Marie Kieffer, Hastings, MN (US); Victor Fuk-Pong Man, Saint Paul, MN (US); Melissa Hunter, Lakeville, MN (US)

(73) Assignee: ECOLAB USA INC., Saint Paul, MN (US)

( * ) Notice: Subject to any disclaimer, the term of this patent is extended or adjusted under 35 U.S.C. 154(b) by 175 days.

This patent is subject to a terminal disclaimer.

(21) Appl. No.: 18/489,218

(22) Filed: Oct. 18, 2023

(65) Prior Publication Data

US 2024/0101931 A1 Mar. 28, 2024

Related U.S. Application Data

(60) Continuation-in-part of application No. 17/812,296, filed on Jul. 13, 2022, now Pat. No. 11,827,865, (Continued)

(51) Int. Cl.
*C11D 3/34* (2006.01)
*C11D 1/72* (2006.01)
(Continued)

(52) U.S. Cl.
CPC .............. *C11D 3/3418* (2013.01); *C11D 1/72* (2013.01); *C11D 1/722* (2013.01); *C11D 1/825* (2013.01);
(Continued)

(58) Field of Classification Search
CPC ......... C11D 34/18; C11D 31/72; C11D 1/722; C11D 1/825; C11D 17/004
See application file for complete search history.

(56) References Cited

U.S. PATENT DOCUMENTS 4,001,132 A 1/1977 Maguire, Jr.
4,426,362 A 1/1984 Copeland et al.
(Continued)

FOREIGN PATENT DOCUMENTS

DE 69918694 T2 7/2005
EP 0019484 A1 11/1980
(Continued)

OTHER PUBLICATIONS

BASF Corporation Technical Bulletin, "Plurafac LF-221 Alcohol Alkoxylate", 2002 BASF Corporation, Mount Olive, New Jersey (1 page). Dec. 31, 2002.
(Continued)

*Primary Examiner* — Mark Eashoo
*Assistant Examiner* — M. Reza Asdjodi
(74) *Attorney, Agent, or Firm* — McKee, Voorhees & Sease, PLC

(57) ABSTRACT

The invention includes a solid rinse aid that is particularly designed for pressed or extrusion solid formation and which is effective for spotless surfaces after rinsing, especially rinsing metals without corrosion. According to the invention, a solid acid is combined with a short-chain alkylbenzene and alkyl naphthalene sulfonate. The short-chain alkylbenzene and alkyl naphthalene sulfonate act as a solidification agent as well as a hydrotrope, and total dissolved solid (TDS) active and are combined with at least one nonionic low foaming surfactant.

15 Claims, 5 Drawing Sheets

Related U.S. Application Data which is a continuation of application No. 15/975,843, filed on May 10, 2018, now Pat. No. 11,421,185, which is a division of application No. 15/392,764, filed on Dec. 28, 2016, now Pat. No. 10,421,933, which is a continuation of application No. 14/659,679, filed on Mar. 17, 2015, now Pat. No. 10,000,725, which is a continuation-in-part of application No. 14/010,815, filed on Aug. 27, 2013, now Pat. No. 9,567,551, which is a continuation of application No. 13/530,152, filed on Jun. 22, 2012, now Pat. No. 9,011,610.

(51) Int. Cl.

| | |
|---|---|
| ***C11D 1/722*** | (2006.01) |
| ***C11D 1/825*** | (2006.01) |
| ***C11D 3/00*** | (2006.01) |
| ***C11D 3/20*** | (2006.01) |
| ***C11D 11/00*** | (2006.01) |
| ***C11D 17/00*** | (2006.01) |

(52) U.S. Cl.

CPC .......... *C11D 3/0021* (2013.01); *C11D 3/2068* (2013.01); *C11D 17/0047* (2013.01); *C11D 2111/18* (2024.01)

(56) References Cited

U.S. PATENT DOCUMENTS 4,492,646 A 1/1985 Welch
4,618,914 A 10/1986 Sato et al.
4,647,258 A 3/1987 Massarsch
4,654,161 A 3/1987 Kollmeier et al.
4,687,121 A 8/1987 Copeland
4,690,305 A 9/1987 Copeland
RE32,763 E 10/1988 Fernholtz et al.
RE32,818 E 1/1989 Fernholtz et al.
4,826,661 A 5/1989 Copeland et al.
4,830,773 A 5/1989 Olson
5,273,677 A 12/1993 Arif
5,358,653 A 10/1994 Gladfelter et al.
5,397,506 A 3/1995 Groth et al.
5,474,698 A 12/1995 Rolando et al.
5,501,815 A 3/1996 Man
5,589,099 A 12/1996 Baum
5,603,776 A 2/1997 Lentsch et al.
5,635,167 A 6/1997 Said et al.
5,674,831 A 10/1997 Schulz et al.
5,858,946 A 1/1999 Foley et al.
5,876,514 A 3/1999 Rolando et al.
5,880,088 A 3/1999 Lentsch et al.
5,880,089 A 3/1999 Lentsch et al.
H1818 H 11/1999 Potgieter et al.
6,211,129 B1 4/2001 Gladfelter et al.
6,257,253 B1 7/2001 Lentsch et al.
6,258,765 B1 7/2001 Wei et al.
6,294,515 B1 9/2001 Baum
6,432,906 B1 8/2002 Carlson et al.
6,530,383 B1 3/2003 Rogmann et al.
6,537,961 B1 3/2003 Koch
RE38,262 E 10/2003 Rolando et al.
6,630,440 B1 10/2003 Song et al.
6,956,019 B2 10/2005 Lentsch et al.
6,964,943 B1 11/2005 Bettiol et al.
7,279,455 B2 10/2007 Kiefer et al.
7,521,412 B2 * 4/2009 Kieffer ................ C11D 3/0026 510/501
7,592,301 B2 9/2009 Smith et al.
7,838,485 B2 11/2010 Heisig et al.
7,960,333 B2 * 6/2011 Kieffer ................ C11D 3/3707 510/525
8,324,147 B2 12/2012 Kieffer et al.
8,383,570 B2 2/2013 Kieffer et al.
8,450,264 B1 5/2013 Kieffer et al.
8,957,011 B2 2/2015 Kieffer
9,011,610 B2 * 4/2015 Kieffer .................. C11D 1/722 510/495
9,567,551 B2 * 2/2017 Sun ........................ C11D 1/825
10,000,725 B2 * 6/2018 Kieffer ................ C11D 3/0021
10,081,781 B2 * 9/2018 Foster ................. C11D 3/3418
10,421,933 B2 * 9/2019 Sun ...................... C11D 3/2075
11,421,185 B2 * 8/2022 Kieffer .................... C11D 1/72
11,827,865 B2 * 11/2023 Kieffer ................ C11D 3/0021
2001/0031714 A1 10/2001 Gassenmeier
2002/0028754 A1 3/2002 Johansen et al.
2002/0192340 A1 12/2002 Swart et al.
2003/0109403 A1 6/2003 Man et al.
2003/0162678 A1 8/2003 Ashton et al.
2003/0162689 A1 8/2003 Schymitzek et al.
2003/0166494 A1 9/2003 Man et al.
2003/0171243 A1 9/2003 Kischkel et al.
2003/0195134 A1 * 10/2003 Vandijk ............... C11D 3/3409 510/421
2004/0033269 A1 2/2004 Hei et al.
2004/0110657 A1 6/2004 Strothoff
2004/0157760 A1 8/2004 Man et al.
2004/0180807 A1 9/2004 Song
2005/0020466 A1 1/2005 Man et al.
2005/0101516 A1 5/2005 Kieffer et al.
2005/0130865 A1 6/2005 Schmid et al.
2005/0143280 A1 6/2005 Nelson et al.
2006/0058209 A1 3/2006 Lentsch et al.
2006/0189508 A1 8/2006 Brooker et al.
2006/0246242 A1 11/2006 Siegel et al.
2007/0253926 A1 11/2007 Tadrowski et al.
2008/0234173 A1 9/2008 Warr et al.
2008/0293615 A1 11/2008 Kieffer et al.
2009/0035339 A1 2/2009 Istvan et al.
2009/0196897 A1 8/2009 Gladfelter et al.
2009/0203569 A1 8/2009 Kieffer et al.
2010/0009886 A1 1/2010 Smith et al.
2010/0292127 A1 11/2010 Kieffer et al.
2010/0300044 A1 12/2010 Man et al.
2011/0108068 A1 * 5/2011 Kieffer .................. C11D 3/323 134/25.2
2011/0126858 A1 6/2011 Song
2012/0231992 A1 9/2012 Kieffer et al.
2013/0345112 A1 * 12/2013 Sun ....................... C11D 1/722 510/513
2016/0060579 A1 * 3/2016 Silvernail ............ C11D 3/3418 134/22.16
2017/0298298 A1 * 10/2017 Kieffer ............... C11D 17/0047
2021/0292681 A1 * 9/2021 Kieffer .................. C11D 3/046
2024/0043774 A1 * 2/2024 Kieffer ................ C11D 3/3418
2024/0101931 A1 * 3/2024 Kieffer ................ C11D 3/2075

FOREIGN PATENT DOCUMENTS

EP 0231603 A1 8/1987
EP 0875556 A2 11/1998
EP 1352951 A1 10/2003
EP 1102834 B1 7/2004
JP 2010508901 A 9/1998
JP 2002522592 A 7/2002
JP 2003534390 A 11/2003
JP 2004204016 7/2004
JP 2006208873 A 8/2006
JP 200777290 A 3/2007
JP 2009111294 A 5/2009
JP 2012510341 A 5/2012
JP 2013512041 A 4/2013
JP 2016534204 A 11/2016
WO 8911525 A1 11/1989
WO 9220774 A1 11/1992
WO 199305141 A1 3/1993
WO 199909126 A1 2/1999
WO 0008125 A1 2/2000
WO 0046327 A1 8/2000
WO 0183879 A1 11/2001
WO 03087288 A1 10/2003
WO 2005047440 A1 5/2005

(56) References Cited

FOREIGN PATENT DOCUMENTS

| | | | |
|---|---|---|---|
| WO | 2005085321 | A1 | 9/2005 |
| WO | 2007049249 | A1 | 5/2007 |
| WO | 2008146177 | A1 | 12/2008 |
| WO | 2010131217 | A1 | 11/2010 |
| WO | 2011066206 | A1 | 6/2011 |
| WO | 2011112674 | | 9/2011 |

OTHER PUBLICATIONS

DOW Personal Care, "KATHON CG, A Safe, Effective, Globally Approved Preservative for Rinse-Off Products", Rohm and Haas, 2007 (9 pages). Dec. 31, 2007.

Ecolab USA Inc., PCT/US2013/059013 filed Sep. 10, 2013, "The International Search Report and the Written Opinion of the International Searching Authority, or the Declaration", mailed Nov. 20, 2013.

Ecolab USA Inc., PCT/US2013/046589 filed Jun. 19, 2013, "The International Search Report and the Written Opinion of the International Searching Authority, or the Declaration", mailed Sep. 24, 2013.

Burns, Robert L., "Hydrotropic Properties of Some Short-Chain Alkylbenzene—and Alkylnaphthalene Sulfonates", Journal of Surfactants and Detergents, vol. 2, No. 1, pp. 13-16. Jan. 31, 1999.

* cited by examiner

SOLID FAST DRAINING/DRYING RINSE AID FOR HIGH TOTAL DISSOLVED SOLID WATER CONDITIONS

CROSS REFERENCE TO RELATED APPLICATION

This is a continuation-in-part of U.S. Ser. No. 17,812,296, filed Jul. 13, 2022, which is a continuation application of U.S. Ser. No. 15/975,843, filed May 10, 2018, now U.S. Pat. No. 11,421,185, issued Aug. 23, 2022, which is a divisional application of U.S. Ser. No. 15/392,764, filed Dec. 28, 2016, now U.S. Pat. No. 10,421,933, issued Sep. 24, 2019, which is a continuation application of U.S. Ser. No. 14/659,679, filed Mar. 17, 2015, now U.S. Pat. No. 10,000,725, issued Jun. 19, 2018, which is a continuation-in-part application of U.S. Ser. No. 14/010,815, filed Aug. 27, 2013, now U.S. Pat. No. 9,567,551, issued Feb. 14, 2017, which is a continuation application of U.S. Ser. No. 13/530,152, filed Jun. 22, 2012, now U.S. Pat. No. 9,011,610, issued Apr. 21, 2015, all of which are herein incorporated by reference in their entireties.

FIELD OF INVENTION

The present invention relates to solid rinse aid compositions, and methods for manufacturing and using the same. The rinse aid compositions generally include a novel solidification system and surfactants designed for use in pressed or extruded solid formation. The rinse aids can be used in aqueous use solutions on articles including, for example, cookware, dishware, flatware, glasses, cups, hard surfaces, healthcare surfaces, glass surfaces, vehicle surfaces, etc. but are particularly useful for metal surfaces.

BACKGROUND OF THE INVENTION

Mechanical warewashing machines have been common in the institutional and household environments for many years. Such automatic warewashing machines clean dishes using two or more cycles which can include initially a wash cycle followed by a rinse cycle, but may also utilize soak, pre-wash, scrape, sanitizing, drying, and additional wash cycles. Rinse agents are conventionally used in warewashing applications to promote drying and to prevent the formation of spots.

Rinse agents may also be used in healthcare environments, typically for cleaning a medical cart, cage, instrument, or device. Typically, cleaning a medical cart, cage, instrument, or device includes contacting the medical cart, cage, instrument, or device with an aqueous cleaning composition and, rinsing or contacting the same with a rinse solution comprising a dissolved rinse aid. The method can also involve antimicrobial treatment of the medical cart, cage, instrument, or device by contacting with an aqueous antimicrobial composition formed by dissolving or suspending a solid antimicrobial composition, preferably a solid quaternary ammonium or solid halogen antimicrobial composition.

In either household, institutional, or healthcare environments, rinse agents to reduce the formation of spotting have been, commonly been added to water to form an aqueous rinse that is sprayed on the hard surfaces after cleaning is complete. The precise mechanism through which rinse agents work is not established. One theory holds that the surfactant in the rinse agent is absorbed on the surface at temperatures at or above its cloud point, and thereby reduces the solid-liquid interfacial energy and contact angle. This leads to the formation of a continuous sheet which drains evenly from the surface and minimizes the formation of spots. Generally, high foaming surfactants have cloud points above the temperature of the rinse water, and, according to this theory, would not promote sheet formation, thereby resulting in spots. Moreover, high foaming materials are known to interfere with the operation of warewashing machines.

A number of rinse aids are currently known, each having certain advantages and disadvantages. There is an ongoing need for alternative rinse aid compositions, especially alternative rinse aid compositions that are environmentally friendly (e.g., biodegradable), non-corrosive to metal, can handle high total dissolved solids, can handle high water hardness and are easily manufactured as solids.

SUMMARY OF THE INVENTION

The invention includes a solid rinse aid that is particularly designed for pressed or extrusion solid formation and which is effective for leaving spotless surfaces after rinsing, especially rinsing metals without corrosion. According to the invention, a solid acid is combined with a short-chain alkylbenzene and alkyl naphthalene sulfonate class of hydrotopes, such as sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butylnaphthalene. The short-chain alkylbenzene and alkyl naphthalene sulfonate class of hydrotopes act as a solidification agent as well as a surfactant and are combined with at least one nonionic low foaming surfactant.

A solid rinse agent composition of the present invention thus includes a solid acid for hardness control, a short chain alkyl benzene and/or alkyl naphthalene sulfonate, preferably sodium xylene sulfonate (SXS), and a surfactant system. The surfactant is preferably a non-ionic low foaming surfactant.

The composition of the invention is particularly beneficial for use with hard water and also high total dissolved solid (TDS) conditions.

The rinse aid concentrate is typically provided in a solid form. This is typically prepared by the steps of combining the solid materials then adding any liquid components. The material is then pressed or extruded to form a solid. In general, it is expected that the solid concentrate will be diluted with water to provide the use solution that is then supplied to the surface of a substrate. The use solution preferably contains an effective amount of active material to provide spotless surfaces by rinse water. It should be appreciated that the term "active materials" refers to the nonaqueous portion of the use solution that functions to reduce spotting and filming.

Some example methods for using the rinse aid generally include the step of providing the rinse aid, mixing the rinse aid into an aqueous use solution, and applying the aqueous use solution to a substrate surface.

In some embodiments, the solid acid is present in an amount of from about 5 wt. % to about 40 wt. %. The short chain alkyl benzene or alkyl naphthalene sulfonate is present 50 wt % to 80 wt % and the nonionic surfactant is present from about 5 wt. % to about 20 wt. % for pressed solid and from about 5 wt. % to about 30 wt. % for an extruded solid. The solid rinse aid can also in some embodiments and as enumerated hereinafter, include an additional surfactant, a processing aids such as polyethylene glycol or urea, as well as other components such as a chelant, preservative, fragrant, or dye.

In some aspects, the present invention is related to methods for rinsing surfaces in a warewashing application or surfaces involved in healthcare. The methods comprise providing an aqueous rinse aid composition, diluting the rinse aid composition with water to form an aqueous use solution; and applying the aqueous use solution to the surfaces.

DETAILED DESCRIPTION OF THE INVENTION

Figure 1:
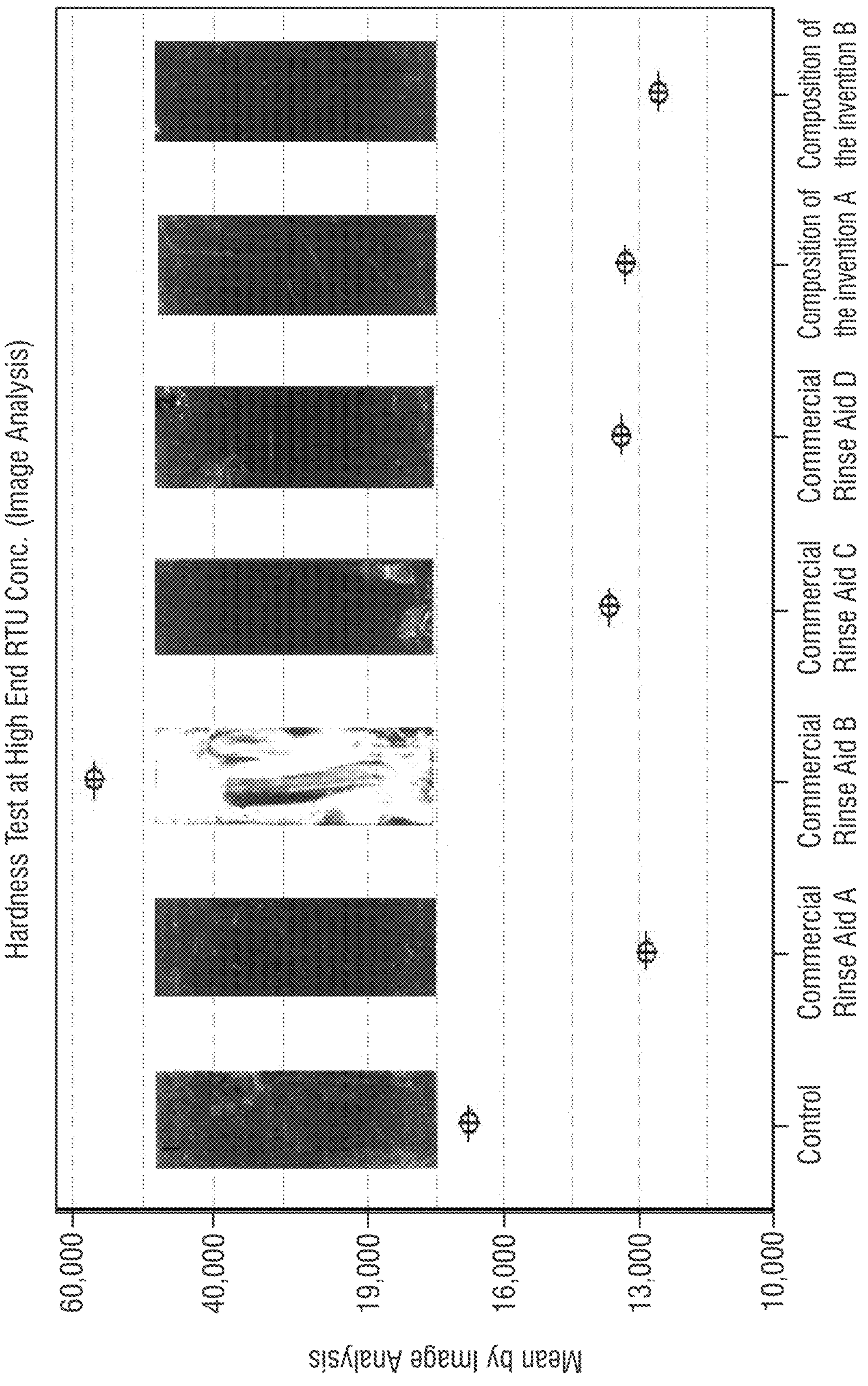
FIG. 1 is s a graph showing hardness performance of compositions of the invention A and B and different commercial rinse aids A-D.

The present invention relates to rinse aid compositions, and methods for making and using rinse aid compositions. In some aspects, the present invention provides rinse aid compositions including a solid acid, a short-chain alkylbenzene and alkyl naphthalene sulfonate, such as sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butylnaphthalene, and at least one additional surfactant preferably a nonionic low foaming surfactant.

The compositions of the present invention can be used to reduce spotting and filming on a variety of surfaces including, but not limited to, plasticware, cookware, dishware, flatware, glasses, cups, hard surfaces, glass surfaces, healthcare surfaces and vehicle surfaces.

So that the invention may be understood more clearly, certain terms are first defined.

As used herein, the term "ware" refers to items such as eating, cooking, and serving utensils. Exemplary items of ware include, but are not limited to: dishes, e.g., plates and bowls; silverware, e.g., forks, knives, and spoons; cups and glasses, e.g., drinking cups and glasses; serving dishes, e.g., fiberglass trays, insulated plate covers. As used herein, the term "warewashing" refers to washing, cleaning, or rinsing ware. The items of ware that can be contacted, e.g., washed, or rinsed, with the compositions of the invention can be made of any material. For example, ware includes items made of wood, metal, ceramics, glass, etc. Ware also refers to items made of plastic. Types of plastics that can be cleaned or rinsed with the compositions according to the invention include but are not limited to, those that include polycarbonate polymers (PC), acrilonitrile-butadiene-styrene polymers (ABS), and polysulfone polymers (PS). Another exemplary plastic that can be cleaned using the methods and compositions of the invention include polyethylene terephthalate (PET).

As used herein, the term "hard surface" includes showers, sinks, toilets, bathtubs, countertops, windows, mirrors, transportation vehicles, floors, and the like.

As used herein, the phrase "healthcare surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning using water treated according to the methods of the present invention.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning using water treated according to the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

By the term "solid" as used with reference to the composition of the invention, it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid composition can range from that of a fused solid block which is relatively dense and hard, for example, like concrete, to a consistency characterized as being malleable and sponge-like, similar to caulking material.

The "cloud point" of a surfactant rinse or sheeting agent is defined as the temperature at which a 1 wt. % aqueous solution of the surfactant turns cloudy when warmed.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the phrase "medical cart" refers to a cart employed in a health care environment to transport one or more medical instruments, devices, or equipment and that can benefit from cleaning with a use composition of a solid cleaning composition, rinsing with a use composition of a solid rinse composition, and/or antimicrobial treatment with a use composition of a solid antimicrobial composition. Medical carts include carts for transporting medical or dental devices or instruments or other medical or dental equipment in a health care environment, such as a hospital, clinic, dental or medical office, nursing home, extended care facility, or the like.

As used herein, the phrase "medical cage" refers to a cage employed in a health care environment to house and/or transport one or more animals employed in experiments, in clinical or toxicological testing, in diagnostics, or the like. Such animals include a rodent (e.g. a mouse or a rat), a rabbit, a dog, a cat, or the like. A medical cage typically includes an animal cage that actually houses the animal and which can be mounted on a wheeled rack. The medical cage can also include one or more containers or dispensers for animal food, one or more vessels or dispensers for water, and/or one or more systems for identifying the cart or animals. Medical cages can benefit from cleaning with a use composition of a solid alkaline cleaning composition, rinsing with a use composition of a solid rinse composition, and/or antimicrobial treatment with a use composition of a solid antimicrobial composition.

As used herein, the term "instrument" refers to the various medical or dental instruments or devices that can benefit from cleaning with a use composition of a solid alkaline cleaning composition, rinsing with a use composition of a solid rinse composition, and/or antimicrobial treatment with a use composition of a solid antimicrobial composition.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the term "alkyl" refers to a straight or branched chain monovalent hydrocarbon radical optionally containing one or more heteroatomic substitutions independently selected from S, O, Si, or N. Alkyl groups generally include those with one to twenty atoms. Alkyl groups may be unsubstituted or substituted with those substituents that do not interfere with the specified function of the composition. Substituents include alkoxy, hydroxy, mercapto, amino, alkyl substituted amino, or halo, for example. Examples of "alkyl" as used herein include, but are not limited to, methyl, ethyl, n-propyl, n-butyl, n-pentyl, isobutyl, and isopropyl, and the like. In addition, "alkyl" may include "alylenes", "alkenylenes", or "alkylynes".

As used herein, the term "alkylene" refers to a straight or branched chain divalent hydrocarbon radical optionally containing one or more heteroatomic substitutions independently selected from S, O, Si, or N. Alkylene groups generally include those with one to twenty atoms. Alkylene groups may be unsubstituted or substituted with those substituents that do not interfere with the specified function of the composition. Substituents include alkoxy, hydroxy, mercapto, amino, alkyl substituted amino, or halo, for example. Examples of "alkylene" as used herein include, but are not limited to, methylene, ethylene, propane-1,3-diyl, propane-1,2-diyl and the like.

As used herein, the term "alkenylene" refers to a straight or branched chain divalent hydrocarbon radical having one or more carbon-carbon double bonds and optionally containing one or more heteroatomic substitutions independently selected from S, O, Si, or N. Alkenylene groups generally include those with one to twenty atoms. Alkenylene groups may be unsubstituted or substituted with those substituents that do not interfere with the specified function of the composition. Substituents include alkoxy, hydroxy, mercapto, amino, alkyl substituted amino, or halo, for example. Examples of "alkenylene" as used herein include, but are not limited to, ethene-1,2-diyl, propene-1,3-diyl, and the like.

As used herein, the term "alkylyne" refers to a straight or branched chain divalent hydrocarbon radical having one or more carbon-carbon triple bonds and optionally containing one or more heteroatomic substitutions independently selected from S, O, Si, or N. Alkylyne groups generally include those with one to twenty atoms. Alkylyne groups may be unsubstituted or substituted with those substituents that do not interfere with the specified function of the composition. Substituents include alkoxy, hydroxy, mercapto, amino, alkyl substituted amino, or halo, for example.

As used herein, the term "alkoxy", refers to —O-alkyl groups wherein alkyl is as defined above.

As used herein, the term "halogen" or "halo" shall include iodine, bromine, chlorine and fluorine.

As used herein, the terms "mercapto" and "sulfhydryl" refer to the substituent —SH.

As used herein, the term "hydroxy" refers to the substituent —OH.

A used herein, the term "amino" refers to the substituent $—NH_2$.

The methods and compositions of the present invention can comprise, consist of, or consist essentially of the listed steps or ingredients. As used herein the term "consisting essentially of" shall be construed to mean including the listed ingredients or steps and such additional ingredients or steps which do not materially affect the basic and novel properties of the composition or method. In some embodiments, a composition in accordance with embodiments of the present invention that "consists essentially of" the recited ingredients does not include any additional ingredients that alter the basic and novel properties of the composition, e.g., the drying time, sheeting ability, spotting or filming properties of the composition.

As used herein, "weight percent (wt %)," "percent by weight," "% by weight," and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

Solid Rinse Aid Compositions

A solid rinse agent composition of the present invention includes a solid acid, a short-chain alkylbenzene or alkyl naphthalene sulfonate, such as sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butylnaphthalene, and a one or more surfactants, preferably at least one of which is a nonionic low foaming surfactant.

The solid rinse aid composition is advantageously formulated to give spotless surfaces after rinsing, especially in high hardness and high total dissolved solids (TDS) situations. The rinse aid is also particularly useful for metal surfaces and avoids corrosion of the same.

Solid Acid

The invention includes one or more solid acids. The solid acid of the composition includes any acid which is naturally or treated to be in solid form at room temperature. The term solid here includes forms such as powdered, particulate, or granular solid forms. Acidic substances (herein referred to as "acids") include, but are not limited to, pharmaceutically acceptable organic or inorganic acids, hydroxyl-acids, amino acids, Lewis acids, mono- or di-alkali or ammonium salts of molecules containing two or more acid groups, and monomers or polymeric molecules containing at least one acid group. Examples of suitable acid groups include carboxylic, hydroxamic, amide, phosphates (e.g., mono-hydrogen phosphates and di-hydrogen phosphates), sulfates, and bi-sulfites.

In particular, the acids are organic acids with 2-18 carbon atoms, including, but not limited to, short, medium, or long chain fatty acids, hydroxyl acids, inorganic acids, amino acids, and mixtures thereof. Preferably, the acid is selected from the group consisting of lactic acid, gluconic acid, citric acid, tartaric acid, phosphoric acid, maleic acid, monosodium citrate, disodium citrate, potassium citrate, monosodium tartrate, disodium tartrate, potassium tartrate, aspartic acid, carboxymethylcellulose, acrylic polymers, methacrylic polymers, and mixtures thereof.

For example many organic acids are crystalline solids in pure form (and at room temperature), e.g. citric acid, oxalic acid, benzoic acid. Sulphamic acid in an example of an inorganic acid that is solid a room temperature.

The solid acid or combination of one or more solid acids is present in the rinse aid compositions of the invention in an amount of from about 5 wt. % to about 40 wt. %, preferably from about 7.5 wt. % to about 27.5 wt. % and more preferably from about 10 wt. % to about 25 wt. %.

Short Chain Alkyl Benzene Or Alkyl Naphthalene Sulfonate

The class of short chain alkyl benzene or alkyl naphthalene sulfonates work as both a hardening agent and as a hydrotrope and TDS control active in the composition. The group includes alkyl benzene sulfonates based on toluene, xylene, and cumene, and alkyl naphthalene sulfonates. Sodium toluene sulfonate and sodium xylene sulfonate are the best known hydrotopes. These have the general formula below:

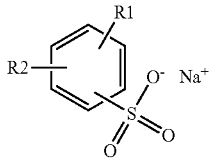

R1 = C1, C2 OR C3
R2 = C1 OR H
ALKYLBENZENE SULFONATE

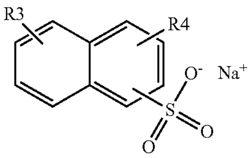

R3 = C1, C2, C3, C4 OR H
R4 = C1, C2, C3, C4 OR H
ALKYLNAPHTHALENE SULFONATE

This group includes but is not limited to sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butylnaphthalene sulfonate. In a preferred embodiment the solidification agent is SXS.

The invention provides a solid rinse aid composition including effective amounts of one or more of a short chain alkyl benzene or alkyl naphthalene sulfonates. Surprisingly, this class of hydrotopes has been found to add to performance of the solid rinse aid as well as functioning as solidification agent. The short chain alkyl benzene or alkyl naphthalene sulfonate may also function as a builder. The solid rinse aid composition typically has a melt point greater than 110° F. and is dimensionally stable. In some embodiments, the hardening agent of a short chain alkyl benzene or alkyl naphthalene sulfonate is present in an amount of from about 40 wt. % to about 90 wt. %, preferably from about 45 wt. % to about 85 wt. % and more preferably from about 50 wt. % to about 80 wt. %. In other embodiments, the short chain alkyl benzene or alkyl naphthalene sulfonate is in a range of about 65 to about 85 wt %.

The solid rinse aid can also in some embodiments and as enumerated hereinafter, include an additional processing aids, such as polyethylene glycol, or urea. The additional processing aids if used is present in an amount of from about 0.1 wt % to about 10 wt %.

Nonionic Surfactant

Nonionic surfactants useful in the invention are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants in the present invention include:

Examples of suitable nonionic surfactants include alkoxylated surfactants, such as Dehypon LS-54 (R-$(EO)_5(PO)_4$) and Dehypon LS-36 (R-$(EO)_3(PO)_6$); and capped alcohol alkoxylates, such as Plurafac LF221 and Genepol from Clamant, Tegoten EC11; mixtures thereof, or the like.))

Other nonionic surfactants that can used include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronico manufactured by BASF Corp.

Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from 1,000 to 4,000. Ethylene oxide is then added to sandwich this hydrophobe between hydrophilic groups, controlled by length to constitute from about 10% by weight to about 80% by weight of the final molecule.

Tetronic® compounds are tetra-functional block copolymers derived from the sequential addition of propylene oxide and ethylene oxide to ethylenediamine. The molecular weight of the propylene oxide hydrotype ranges from 500 to 7,000; and, the hydrophile, ethylene oxide, is added to constitute from 10% by weight to 80% by weight of the molecule.

2. Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Dow.

3. Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.

4. Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

In a preferred embodiment the nonionic surfactant is a low-foaming anionic surfactant. Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from 1,000 to 3,100 with the central hydrophile including 10% by weight to 80% by weight of the final molecule. These reverse Pluronics® are manufactured by BASF Corporation under the trade name Pluronic® R surfactants.

Likewise, the Tetronic® R surfactants are produced by BASF Corporation by the sequential addition of ethylene oxide and propylene oxide to ethylenediamine. The hydrophobic portion of the molecule weighs from 2,100 to 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

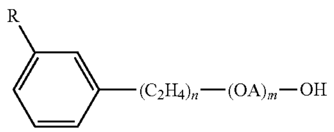

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_m$ H wherein Y is the residue of organic compound having from 1 to 6 carbon atoms and one reactive hydrogen atom, n has an average value of at least 6.4, as determined by hydroxyl number and m has a value such that the oxyethylene portion constitutes 10% to 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_m H]_x$ wherein Y is the residue of an organic compound having from 2 to 6 carbon atoms and containing x reactive hydrogen atoms in which x has a value of at least 2, n has a value such that the molecular weight of the polyoxypropylene hydrophobic base is at least 900 and m has value such that the oxyethylene content of the molecule is from 10% to 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_m H]_x$ wherein P is the residue of an organic compound having from 8 to 18 carbon atoms and containing x reactive hydrogen atoms in which x has a value of 1 or 2, n has a value such that the molecular weight of the polyoxyethylene portion is at least 44 and m has a value such that the oxypropylene content of the molecule is from 10% to 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R^2CONR^1Z$ in which: $R^1$ is H, $C_1$-$C_4$ hydrocarbyl, 2-hydroxy ethyl, 2-hydroxy propyl, ethoxy, propoxy group, or a mixture thereof; R is a $C_5$-$C_3$ 1 hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from 0 to 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_{10}$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from 6 to 30 carbon atoms and a polysaccharide, e.g., a polyglycoside, hydrophilic group containing from 1.3 to 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use in the present compositions include those having the formula: $R^6CON(R^7)_2$ in which $R^6$ is an alkyl group containing from 7 to 21 carbon atoms and each $R^7$ is independently hydrogen, $C_1$-$C_4$ alkyl, $C_1$-$C_4$ hydroxyalkyl, or —$(C_2H_4O)_xH$, where x is in the range of from 1 to 3.

13. A useful class of non-ionic surfactants includes the class defined as alkoxylated amines or, most particularly, alcohol alkoxylated/aminated/alkoxylated surfactants. These non-ionic surfactants may be at least in part represented by the general formulae:

$$R^{20}\text{--}(PO)_s\,N\text{-}(EO)_t\,H,$$

$$R_20\text{--}(PO)_s\,N\text{-}(EO)_t\,H(EO)_t\,H,\ \text{and}$$

$$R^{20}\text{--}N(EO)_t\,H;$$

in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula:

$$R^{20}\text{---}(PO)_v\text{—}N[(EO)_wH][(EO)_zH]$$

in which $R^{20}$ is as defined above, v is 1 to 20 (e.g., 1, 2, 3, or 4 (preferably 2)), and w and z are independently 1-10, preferably 2-5.

These compounds are represented commercially by a line of products sold by Huntsman Chemicals as nonionic surfactants. A preferred chemical of this class includes Surfonic PEA 25 Amine Alkoxylate.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Water

The solid rinse aid composition can in some embodiments includes water. Water many be independently added to the solid rinse aid composition or may be provided in the solid rinse aid composition as a result of its presence in a material that is added to the solid rinse aid composition. For example, materials added to the solid rinse aid composition include water or may be prepared in an aqueous premix available for reaction with the solidification agent component(s). Typically, water is introduced into the solid rinse aid composition to provide the composition with a desired viscosity prior to solidification, and to provide a desired rate of solidification.

In general, it is expected that water may be present as a processing aid and may be removed or become water of hydration. It is expected that water may be present in the solid composition. In the solid composition, it is expected that the water will be present in the solid rinse aid composition in the range of between 0 wt. % and 5 wt. %. For example, water is present in embodiments of the solid rinse aid composition in the range of between 0.1 wt. % to about 5 wt. %, or further embodiments in the range of between 0.5 wt. % and about 4 wt. %, or yet further embodiments in the range of between 1 wt. % and 3 wt. %. It should be additionally appreciated that the water may be provided as deionized water or as softened water.

The components used to form the solid composition can include water as hydrates or hydrated forms of the binding agent, hydrates or hydrated forms of any of the other ingredients, and/or added aqueous medium as an aid in processing. It is expected that the aqueous medium will help provide the components with a desired viscosity for processing. In addition, it is expected that the aqueous medium may help in the solidification process when is desired to form the concentrate as a solid.

Additional Functional Materials

As indicated above, the solid rinse aid may contain other functional materials that provide the desired properties and functionality to the solid composition. Functional materials include a material that when dispersed or dissolved in a use solution, provides a beneficial property in a particular use. Examples of such a functional material include preservatives, chelating/sequestering agents; bleaching agents or activators; sanitizers/anti-microbial agents; activators; builder or fillers; anti-redeposition agents; optical brighteners; dyes; odorants or perfumes; stabilizers; processing aids; corrosion inhibitors; fillers; solidifiers; additional hardening agent; additional surfactants, solubility modifiers; pH adjusting agents; humectants; hydrotropes; or a broad variety of other functional materials, depending upon the desired characteristics and/or functionality of the composition. In the context of some embodiments disclosed herein, the functional materials, or ingredients, are optionally included within the solidification matrix for their functional properties. Some more particular examples of functional materials are discussed in more detail below, but it should be understood by those of skill in the art and others that the particular materials discussed are given by way of example only, and that a broad variety of other functional materials may be used.

Preservatives

The solid rinse aid composition may also include effective amounts of preservatives. Often, overall acidity and/or acids in the solid rinse aid composition and the use solution serves a preservative and stabilizing function.

Some embodiments of the inventive solid rinse aid composition also include a preservative system for acidification of the solid rinse aid including sodium bisulfate, organic acids, and/or a mixture of 5-chloro-2-methyl-4-isothiazolin-3-one and 2-methyl-4-isothiazolin-3-one (which is commercially available from Dow as Kathon). In at least some embodiments, the solid rinse aid has pH of 2.0 or less and the use solution of the solid rinse aid has a pH of at least pH 4.0. Typically, sodium bisulfate is included in the solid rinse aid composition as an acid source. In certain embodiments, an effective amount of sodium bisulfate and one or more other acids are included in the solid rinse aid composition as a preservative system. Suitable acids include for example, inorganic acids, such as HCl and organic acids. In certain further embodiments, an effective amount of sodium bisulfate and one or more organic acids are included in the solid rinse aid composition as a preservative system. Suitable organic acids include sorbic acid, benzoic acid, ascorbic acid, erythorbic acid, citric acid, etc. Preferred organic acids include benzoic and ascorbic acid. Generally, effective amounts of sodium bisulfate with or without additional acids are included such that a use solution of the solid rinse aid composition has a pH that shall be less than pH 4.0, often less pH 3.0, and may be even less than pH 2.0.

In other embodiments, the solid rinse aid composition includes sanitizers/anti-microbial agents, in addition to or in alternative the preservative system described above. Suitable sanitizers/anti-microbial agents are described below.

The preservative component, if present is typically an amount of the solid rinse aid component in an amount of from about 0.05 to 20 wt % preferably 0.1 to 15 wt % and most preferably 1 wt % to about 10 wt %.

Chelating/Sequestering Agents

The solid rinse aid composition may also include effective amounts of chelating/sequestering agents, also referred to as builders. In addition, the rinse aid may optionally include one or more additional builders as a functional ingredient. In general, a chelating agent is a molecule capable of coordinating (i.e., binding) the metal ions commonly found in water sources to prevent the metal ions from interfering with the action of the other ingredients of a rinse aid or other cleaning composition. The chelating/sequestering agent may also function as a threshold agent when included in an effective amount.

Often, the solid rinse aid composition is also phosphate-free and/or amino-carboxylate-free. In embodiments of the solid rinse aid composition that are phosphate-free, the additional functional materials, including builders exclude phosphorous-containing compounds such as condensed phosphates and phosphonates.

Suitable additional builders include polycarboxylates. Some examples of polymeric polycarboxylates suitable for use as sequestering agents include those having a pendant carboxylate ($-CO_2$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

In embodiments of the solid rinse aid composition which are not aminocarboxylate-free may include added chelating/sequestering agents which are aminocarboxylates. Some examples of aminocarboxylic acids include, N-hydroxyethyliminodiacetic acid, nitrilotriacetic acid (NTA), ethylenediaminetetraacetic acid (EDTA), N-hydroxyethyl-ethylenediaminetriacetic acid (HEDTA) (in addition to the HEDTA used in the binder), diethylenetriaminepentaacetic acid (DTPA), and the like.

In embodiments of the solid rinse aid composition which are not phosphate-free, added chelating/sequestering agents may include, for example a condensed phosphate, a phosphonate, and the like. Some examples of condensed phosphates include sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration.

In embodiments of the solid rinse aid composition which are not phosphate-free, the composition may include a phosphonate such as 1-hydroxyethane-1,1-diphosphonic acid $CH_3C(OH)[PO(OH)_2]_2$; aminotri(methylenephosphonic acid) $N[CH_2PO(OH)_2]_3$; aminotri(methylenephosphonate), sodium salt $O^+Na^-$
|
$POCH_2N[CH_2PO(ONa)_2]_2$
|
OH 2-hydroxyethyliminobis(methylenephosphonic acid) $HOCH_2\ CH_2\ N[CH_2\ PO(OH)_2]_2$; diethylenetriaminepenta(methylenephosphonic acid) $(HO)_2\ POCH_2\ N[CH_2\ CH_2\ N[CH_2\ PO(OH)_2]_2]_2$; diethylenetriaminepenta(methylenephosphonate), sodium salt $C_9\ H_{(28-x)}\ N_3Na_xO_{15}P_5$ (x=7); hexamethylenediamine(tetramethylenephosphonate), potassium salt $C_{10}\ H_{(28-x)}\ N_2K_xO_{12}P_4$ (x=6); bis(hexamethylene)triamine(pentamethylenephosphonic acid) $(HO_2)POCH_2N[CH_2)_6\ N[CH_2\ PO(OH)_2]_2]_2$; and phosphorus acid $H_3PO_3$. In some embodiments, a phosphonate combination such as ATMP and DTPMP may be used. A neutralized or alkaline phosphonate, or a combination of the phosphonate with an alkali source prior to being added into the mixture such that there is little or no heat or gas generated by a neutralization reaction when the phosphonate is added can be used.

For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

The chelant/sequestering agent, if present may be in an amount of from about 0.1 wt. % to about 30 wt. %, preferably from about 1 wt. % to about 25 wt. % and more preferably from about 5 wt. % to about 20 wt. %. In some embodiments, the solid acid may also perform as a chelant.

Processing Aids

In some embodiments the solid rinse aid composition can include additional processing aids. Examples of processing aids include an amide such as stearic monoethanolamide or lauric diethanolamide, or an alkylamide, and the like; a solid polyethylene glycol, or a solid EO/PO block copolymer, urea and the like; starches that have been made water-soluble through an acid or alkaline treatment process; various inorganics that impart solidifying properties to a heated composition upon cooling, and the like. Such compounds may also vary the solubility of the composition in an aqueous medium during use such that the rinse aid and/or other active ingredients may be dispensed from the solid composition over an extended period of time. The composition may include a secondary hardening agent in an amount in the range of up to about 10 wt %. In some embodiments, secondary hardening agents are may be present in an amount in the range of 0-10 wt %, often in the range of 0 to 5 wt % and sometimes in the range of about 0 to about 0.5 wt-%.

Additional Surfactant

In addition to the nonionic surfactants specified above, the composition may also include other surfactants as enumerated hereinafter.

Anionic Surfactants

Certain embodiments of the invention contemplate the use of one or more anionic surfactants which electrostatically interact or ionically interact with the positively charged polymer to enhance foam stability. Anionic surfactants are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility.

As those skilled in the art understand, anionics are excellent detersive surfactants and are therefore traditionally favored additions to heavy duty detergent compositions as well as rinse aids. Generally, anionics have high foam profiles which are useful for the present foaming cleaning compositions. Anionic surface active compounds are useful to impart special chemical or physical properties other than detergency within the composition.

The majority of large volume commercial anionic surfactants can be subdivided into five major chemical classes and additional sub-groups known to those of skill in the art and described in "Surfactant Encyclopedia," Cosmetics & Toiletries, Vol. 104 (2) 71-86 (1989).

The first class includes acylamino acids (and salts), such as acylgluamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. A particularly preferred anionic surfactant is alpha olefin sulfonate. The fourth class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like. The fifth class includes sulfuric acid esters (and salts), such as alkyl ether sulfates, alkyl sulfates, and the like. A particularly preferred anionic surfactant is sodium laurel ether sulfate.

Anionic sulfate surfactants suitable for use in the present compositions include the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside (the nonionic nonsulfated compounds being described herein). Ammonium and substituted ammonium (such as mono-, di- and triethanolamine) and alkali metal (such as sodium, lithium and potassium) salts of the alkyl mononuclear aromatic sulfonates such as the alkyl benzene sulfonates containing from 5 to 18 carbon atoms in the alkyl group in a straight or branched chain, e.g., the salts of alkyl benzene sulfonates or of alkyl toluene, xylene, cumene and phenol sulfonates; alkyl naphthalene sulfonate, diamyl naphthalene sulfonate, and dinonyl naphthalene sulfonate and alkoxylated derivatives.

Examples of suitable synthetic, water soluble anionic surfactant compounds include the ammonium and substituted ammonium (such as mono-, di- and triethanolamine) and alkali metal (such as sodium, lithium and potassium) salts of the alkyl mononuclear aromatic sulfonates such as the alkyl benzene sulfonates containing from 5 to 18 carbon atoms in the alkyl group in a straight or branched chain, e.g., the salts of alkyl benzene sulfonates or of alkyl toluene, xylene, cumene and phenol sulfonates; alkyl naphthalene sulfonate, diamyl naphthalene sulfonate, and dinonyl naphthalene sulfonate and alkoxylated derivatives.

Anionic carboxylate surfactants suitable for use in the present compositions include the alkyl ethoxy carboxylates, the alkyl polyethoxy polycarboxylate surfactants and the soaps (e.g. alkyl carboxyls). Secondary soap surfactants (e.g. alkyl carboxyl surfactants) useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary soap surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present.

Other anionic surfactants suitable for use in the present compositions include olefin sulfonates, such as long chain alkene sulfonates, long chain hydroxyalkane sulfonates or mixtures of alkenesulfonates and hydroxyalkane-sulfonates. Also included are the alkyl sulfates, alkyl poly(ethyleneoxy) ether sulfates and aromatic poly(ethyleneoxy)sulfates such as the sulfates or condensation products of ethylene oxide and nonyl phenol (usually having 1 to 6 oxyethylene groups per molecule). Resin acids and hydrogenated resin acids are also suitable, such as rosin, hydrogenated rosin, and resin acids and hydrogenated resin acids present in or derived from tallow oil.

The particular salts will be suitably selected depending upon the particular formulation and the needs therein.

Further examples of suitable anionic surfactants are given in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23.

Zwitterionic Surfactants

Zwitterionic surfactants can be thought of as a subset of the amphoteric surfactants. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion, a negative charged carboxyl group, and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. Betaine and sultaine surfactants are exemplary zwitterionic surfactants for use herein.

A general formula for these compounds is:

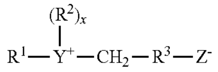

wherein R1 contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-car-boxylate; 5-[S-3-hydroxypropyl-S-hexadecylsulfonio]-3-hydroxypentane-1-sul-fate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propan-e-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxyl-ate; 3-[S-ethyl-S-(3-dodecoxy-2-hydroxypropyl) sulfonio]-propane-1-phosphat-e; 3-[P,P-dimethyl-P-dodecylphosphonio]-propane-1-phosphonate; and S [N,N-di (3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

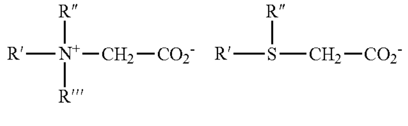

-continued

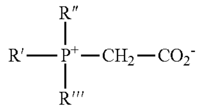

These surfactant betaines typically do not exhibit strong cationic or anionic characters at pH extremes nor do they show reduced water solubility in their isoelectric range. Unlike “external” quaternary ammonium salts, betaines are compatible with anionic s. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R1)_2N.sup.+R^2SO^3$—, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in “Surface Active Agents and Detergents” (Vol. I and II by Schwartz, Perry and Berch).

Betaines and sultaines and other such zwitterionic surfactants are present in an amount of from Anionic surfactants are present in the composition in any detersive amount which can range typically from about 0.01 wt. % to about 75 wt. % of the rinse aid composition. In a preferred embodiment, about 10 wt. % to about 30 wt. % and more preferably from about 15 wt. % to about 25 wt. %.

Semi-Polar Nonionic Surfactants

The semi-polar type of nonionic surface active agents is another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

Amine oxides are tertiary amine oxides corresponding to the general formula:

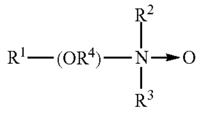

wherein the arrow is a conventional representation of a semi-polar bond; and $R^1$, $R^2$, and $R^3$ may be aliphatic, aromatic, heterocyclic, alicyclic, or combinations thereof. Generally, for amine oxides of detergent interest, $R^1$ is an alkyl radical of from 8 to 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to 20.

Useful water soluble amine oxide surfactants are selected from the coconut or tallow alkyl di-(lower alkyl) amine oxides, specific examples of which are dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylamine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-h-ydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

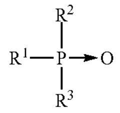

wherein the arrow is a conventional representation of a semi-polar bond; and $R^1$ is an alkyl, alkenyl or hydroxyalkyl moiety ranging from 10 to 24 carbon atoms in chain length; and $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphine oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

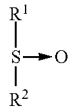

wherein the arrow is a conventional representation of a semi-polar bond; and, $R^1$ is an alkyl or hydroxyalkyl moiety of 8 to 28 carbon atoms, from 0 to 5 ether linkages and from 0 to 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Further examples of suitable anionic surfactants are given in “Surface Active Agents and Detergents” (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

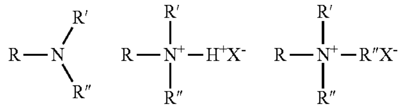

in which, R represents a long alkyl chain, R', R", and R'" may be either long alkyl chains or smaller alkyl or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those of skill in the art and described in "Surfactant Encyclopedia," Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_m R^2_x YLZ$ wherein each $R^1$ is an organic group containing a straight or branched alkyl or alkenyl group optionally substituted with up to three phenyl or hydroxy groups and optionally interrupted by up to four of the following structures:

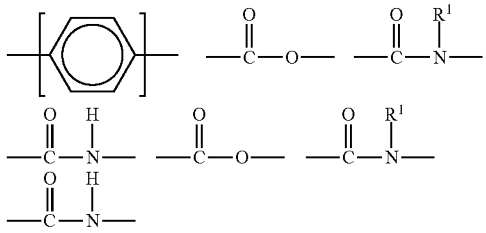

or an isomer or mixture of these structures, and which contains from 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2, or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group is filled by hydrogens.

Y can be a group including, but not limited to:

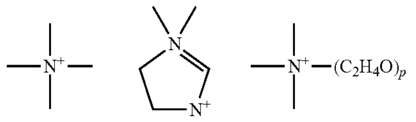

p = about 1 to 12

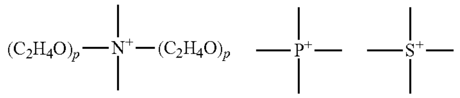

p = about 1 to 12

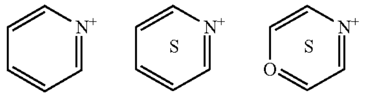

or a mixture thereof.

Preferably, L is 1 or 2, with the Y groups being separated by a moiety selected from $R^1$ and $R^2$ analogs (preferably alkylene or alkenylene) having from 1 to 22 carbon atoms and two free carbon single bonds when L is 2. Z is a water soluble anion, such as sulfate, methylsulfate, hydroxide, or nitrate anion, particularly preferred being sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of the anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia," Cosmetics & Toiletries, Vol. 104 (2) 69-71 (1989). The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

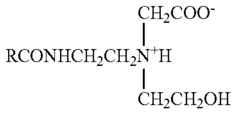

(MONO)ACETATE

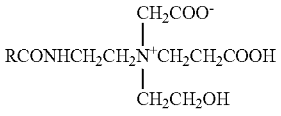

(DI)PROPINATE

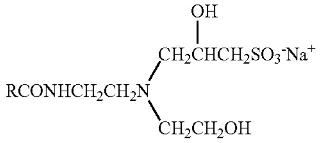

Neutral pH Zwitterion
AMPHOTERIC SULFONATE wherein R is an acyclic hydrophobic group containing from 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Preferred amphocarboxylic acids are produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reacting $RNH_2$, in which R.dbd.$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In these, R is preferably an acyclic hydrophobic group containing from 8 to 18 carbon atoms, and M is a cation to neutralize the charge of the anion.

Preferred amphoteric surfactants include those derived from coconut products such as coconut oil or coconut fatty acid. The more preferred of these coconut derived surfactants include as part of their structure an ethylenediamine moiety, an alkanolamide moiety, an amino acid moiety, preferably glycine, or a combination thereof; and an aliphatic substituent of from 8 to 18 (preferably 12) carbon atoms. Such a surfactant can also be considered an alkyl amphodicarboxylic acid. Disodium cocoampho dipropionate is one most preferred amphoteric surfactant and is commercially available under the tradename Miranol™ FBS from Rhodia Inc., Cranbury, N.J. Another most preferred coconut derived amphoteric surfactant with the chemical name disodium cocoampho diacetate is sold under the tradename Miranol C2M-SF Conc., also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Additional surfactant may be present in the compositions in any detersive amount so long as they do not interfere with the electrostatic, ionic interactions that provide for foam stabilization.

Bleaching Agents

The rinse aid can optionally include bleaching agent. Bleaching agent can be used for lightening or whitening a substrate, and can include bleaching compounds capable of liberating an active halogen species, such as $Cl_2$, $Br_2$, $—OCl^-$ and/or $—OBr^-$, or the like, under conditions typically encountered during the cleansing process. Suitable bleaching agents for use can include, for example, chlorine-containing compounds such as a chlorine, a hypochlorite, chloramines, of the like. Some examples of halogen-releasing compounds include the alkali metal dichloroisocyanurates, chlorinated trisodium phosphate, the alkali metal hypochlorites, monochloramine and dichloroamine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein). A bleaching agent may also include an agent containing or acting as a source of active oxygen. The active oxygen compound acts to provide a source of active oxygen, for example, may release active oxygen in aqueous solutions. An active oxygen compound can be inorganic or organic, or can be a mixture thereof. Some examples of active oxygen compound include peroxygen compounds, or peroxygen compound adducts. Some examples of active oxygen compounds or sources include hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. A rinse aid composition may include a minor but effective amount of a bleaching agent, for example, in some embodiments, in the range of up to about 10 wt. %, and in some embodiments, in the range of about 0.1 to about 6 wt. %.

Activators

In some embodiments, the antimicrobial activity or bleaching activity of the rinse aid can be enhanced by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of up to about 75% by wt. of the composition, in some embodiments, in the range of about 0.01 to about 20% by wt, or in some embodiments, in the range of about 0.05 to 10% by weight of the composition. In some embodiments, an activator for an active oxygen compound combines with the active oxygen to form an antimicrobial agent.

In some embodiments, the rinse aid composition includes a solid, such as a solid flake, pellet, or block, and an activator material for the active oxygen is coupled to the solid. The activator can be coupled to the solid by any of a variety of methods for coupling one solid composition to another. For example, the activator can be in the form of a solid that is bound, affixed, glued or otherwise adhered to the solid of the rinse aid composition. Alternatively, the solid activator can be formed around and encasing the solid rinse aid composition. By way of further example, the solid activator can be coupled to the solid rinse aid composition by the container or package for the composition, such as by a plastic or shrink wrap or film.

Fillers

The rinse aid can optionally include a minor but effective amount of one or more of a filler which does not necessarily perform as a rinse and/or cleaning agent per se, but may cooperate with a rinse agent to enhance the overall capacity of the composition. Some examples of suitable fillers may include sodium chloride, starch, sugars, $C_1$-$C_{10}$ alkylene glycols such as propylene glycol, and the like. In some embodiments, a filler can be included in an amount in the range of up to about 20 wt. %, and in some embodiments, in the range of about 1-15 wt. %. Sodium sulfate is conventionally used as inert filler.

Anti-Redeposition Agents

The rinse aid composition can optionally include an anti-redeposition agent capable of facilitating sustained suspension of soils in a rinse solution and preventing removed soils from being redeposited onto the substrate being rinsed. Some examples of suitable anti-redeposition agents can include fatty acid amides, fluorocarbon surfactants, complex phosphate esters, styrene maleic anhydride copolymers, and cellulosic derivatives such as hydroxyethyl cellulose, hydroxypropyl cellulose, and the like. A rinse aid composition may include up to about 10 wt. %, and in some embodiments, in the range of about 1 to about 5 wt. %, of an anti-redeposition agent.

Dyes/Odorants

Various dyes, odorants including perfumes, and other aesthetic enhancing agents may also be included in the rinse aid. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as CIS-jasmine or jasmal, vanillin, and the like.

Functional Polydimethylsiloxones

The composition can also optionally include one or more functional polydimethylsiloxones. For example, in some embodiments, a polyalkylene oxide-modified polydimethylsiloxane, nonionic surfactant or a polybetaine-modified polysiloxane amphoteric surfactant can be employed as an additive. Both, in some embodiments, are linear polysiloxane copolymers to which polyethers or polybetaines have been grafted through a hydrosilation reaction. Some examples of specific siloxane surfactants are known as SILWET® surfactants available from Union Carbide or ABIL® polyether or polybetaine polysiloxane copolymers available from Goldschmidt Chemical Corp., and described in U.S. Pat. No. 4,654,161 which patent is incorporated herein by reference. In some embodiments, the particular siloxanes used can be described as having, e.g., low surface tension, high wetting ability and excellent lubricity. For example, these surfactants are said to be among the few capable of wetting polytetrafluoroethylene surfaces. The siloxane surfactant employed as an additive can be used alone or in combination with a fluorochemical surfactant. In some embodiments, the fluorochemical surfactant employed as an additive optionally in combination with a silane, can be, for example, a nonionic fluorohydrocarbon, for example, fluorinated alkyl polyoxyethylene ethanols, fluorinated alkyl alkoxylate and fluorinated alkyl esters.

Further description of such functional polydimethylsiloxones and/or fluorochemical surfactants are described in U.S. Pat. Nos. 5,880,088; 5,880,089; and 5,603,776, all of which patents are incorporated herein by reference. We have found, for example, that the use of certain polysiloxane copolymers in a mixture with hydrocarbon surfactants provide excellent rinse aids on plasticware. We have also found that the combination of certain silicone polysiloxane copolymers and fluorocarbon surfactants with conventional hydrocarbon surfactants also provide excellent rinse aids on plasticware. This combination has been found to be better than the individual components except with certain polyalkylene oxide-modified polydimethylsiloxanes and polybetaine polysiloxane copolymers, where the effectiveness is about equivalent. Therefore, some embodiments encompass the polysiloxane copolymers alone and the combination with the fluorocarbon surfactant can involve polyether polysiloxanes, the nonionic siloxane surfactants. The amphoteric siloxane surfactants, the polybetaine polysiloxane copolymers may be employed alone as the additive in the rinse aids to provide the same results.

In some embodiments, the composition may include functional polydimethylsiloxones in an amount in the range of up to about 10 wt-%. For example, some embodiments may include in the range of about 0.1 to 10 wt-% of a polyalkylene oxide-modified polydimethylsiloxane or a polybetaine-modified polysiloxane, optionally in combination with about 0.1 to 10 wt-% of a fluorinated hydrocarbon nonionic surfactant.

Humectant

The composition can also optionally include one or more humectants. A humectant is a substance having an affinity for water. The humectant can be provided in an amount sufficient to aid in reducing the visibility of a film on the substrate surface. The visibility of a film on substrate surface is a particular concern when the rinse water contains in excess of 200 ppm total dissolved solids. Accordingly, in some embodiments, the humectant is provided in an amount sufficient to reduce the visibility of a film on a substrate surface when the rinse water contains in excess of 200 ppm total dissolved solids compared to a rinse agent composition not containing the humectant. The terms "water solids filming" or "filming" refer to the presence of a visible, continuous layer of matter on a substrate surface that gives the appearance that the substrate surface is not clean.

Some example humectants that can be used include those materials that contain greater than 5 wt. % water (based on dry humectant) equilibrated at 50% relative humidity and room temperature. Exemplary humectants that can be used include glycerin, propylene glycol, sorbitol, alkyl polyglycosides, polybetaine polysiloxanes, and mixtures thereof. In some embodiments, the rinse agent composition can include humectant in an amount in the range of up to about 75% based on the total composition, and in some embodiments, in the range of about 5 wt. % to about 75 wt. % based on the weight of the composition.

Other Ingredients

A wide variety of other ingredients useful in providing the particular composition being formulated to include desired properties or functionality may also be included. For example, the rinse aid may include other active ingredients, such as pH modifiers, buffering agents, cleaning enzyme, carriers, processing aids, or others, and the like.

Additionally, the rinse aid can be formulated such that during use in aqueous operations, for example in aqueous cleaning operations, the rinse water will have a desired pH. For example, compositions designed for use in rinsing may be formulated such that during use in aqueous rinsing operation the rinse water will have a pH in the range of about 3 to about 5, or in the range of about 5 to about 9. Liquid product formulations in some embodiments have a (10% dilution) pH in the range of about 2 to about 4. Techniques for controlling pH at recommended usage levels include the use of buffers, alkali, acids, etc., and are well known to those skilled in the art.

Processing and/or Manufacturing of the Composition

The present solid composition can be made by an advantageous method of pressing the solid composition. Specifically, in a forming process, the liquid and solid components are introduced into the final mixing system and are continuously mixed until the components form a substantially homogeneous semi-solid mixture in which the components are distributed throughout its mass. In an exemplary embodiment, the components are mixed in the mixing system for at least approximately 5 seconds. The mixture is then discharged from the mixing system into, or through, a die, press or other shaping means. The product is then packaged. In an exemplary embodiment, the solid formed composition begins to harden between approximately 1 minute and approximately 3 hours. Particularly, the formed composition begins to harden in between approximately 1 minute and approximately 2 hours. More particularly, the formed composition begins to harden in between approximately 1 minute and approximately 20 minutes.

Pressing can employ low pressures compared to conventional pressures used to form tablets or other conventional solid rinse aid compositions. For example, in an embodiment, the present method employs a pressure on the solid of only less than or equal to about 1000 psi. In certain embodiments, the present method employs pressures of less than or equal to about 900 psi, less than or equal to about 800 psi, or less than or equal to about 700 psi. In certain embodiments, the present method can employ pressures as low as greater than or equal to about 1 psi, greater than or equal to about 2, greater than or equal to about 5 psi, or greater than or equal to about 10 psi. In certain embodiments, the present method can employ pressures of about 1 to about 1000 psi, about 2 to about 900 psi, about 5 psi to about 800 psi, or about 10 psi to about 700 psi.

The method of the present invention can produce a stable solid without employing a melt and solidification of the melt as in conventional casting. Forming a melt requires heating a composition to melt it. The heat can be applied externally or can be produced by a chemical exotherm (e.g., from mixing caustic (sodium hydroxide) and water). Heating a composition consumes energy. Handling a hot melt requires safety precautions and equipment. Further, solidification of a melt requires cooling the melt in a container to solidify the melt and form the cast solid. Cooling requires time and/or energy. In contrast, the present method can employ ambient temperature and humidity during solidification or curing of the present compositions. Caustic compositions made according to the present method produce only a slight temperature increase due to the exotherm. The solids of the present invention are held together not by solidification from a melt but by a binding agent produced in the admixed particles and that is effective for producing a stable solid.

The method of the present invention can produce a stable solid without extruding to compress the mixture through a die. Conventional processes for extruding a mixture through a die to produce a solid composition apply high pressures to a solid or paste to produce the extruded solid. In contrast, the present method employs pressures on the solid of only less than or equal to about 1000 psi or even as little as 1 psi. The solids of the present invention are held together not by mere compression but by a binding agent that is effective for producing a stable solid.

Applicants have learned that in preparing the pressed composition, it is advantageous to let the solid components site for a few days before admixing with the liquid components. If liquid is added too quickly the solid ingredients will swell and expand making the material les dense for pressing.

While the invention advantageously may be formed to solid by pressing, other methods of solid formation may also be used such as extrusion, cast molding and the like.

In an exemplary embodiment, a single- or twin-screw extruder may be used to combine and mix one or more components agents at high shear to form a homogeneous mixture. In some embodiments, the processing temperature is at or below the melting temperature of the components. The processed mixture may be dispensed from the mixer by pressing, forming, extruding or other suitable means, whereupon the composition hardens to a solid form. The structure of the matrix may be characterized according to its hardness, melting point, material distribution, crystal structure, and other like properties according to known methods in the art. Generally, a solid composition processed according to the method of the invention is substantially homogeneous with regard to the distribution of ingredients throughout its mass and is dimensionally stable.

The resulting solid composition may take forms including, but not limited to: an extruded, molded or formed solid pellet, block, tablet, powder, granule, flake; or the formed solid can thereafter be ground or formed into a powder, granule, or flake. In an exemplary embodiment, extruded pellet materials formed have a weight of between approximately 50 grams and approximately 250 grams, extruded solids have a weight of approximately 100 grams or greater, and solid blocks formed have a mass of between approximately 1 and approximately 10 kilograms. The solid compositions provide for a stabilized source of functional materials. In a preferred embodiment, the solid composition may be dissolved, for example, in an aqueous or other medium, to create a concentrated and/or use solution. The solution may be directed to a storage reservoir for later use and/or dilution, or may be applied directly to a point of use.

In certain embodiments, the solid rinse aid composition is provided in the form of a unit dose. A unit dose refers to a solid rinse aid composition unit sized so that the entire unit is used during a single washing cycle. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid rinse aid composition is provided in the form of a multiple-use solid, such as, a block or a plurality of pellets, and can be repeatedly used to generate aqueous rinse compositions for multiple washing cycles. In certain embodiments, the solid rinse aid composition is provided as a solid having a mass of about 5 g to 10 kg. In certain embodiments, a multiple-use form of the solid rinse aid composition has a mass of about 1 to 10 kg. In further embodiments, a multiple-use form of the solid rinse aid composition has a mass of about 5 kg to about 8 kg. In other embodiments, a multiple-use form of the solid rinse aid composition has a mass of about 5 g to about 1 kg, or about 5 g and to 500 g.

Packaging System

The solid rinse aid composition can be, but is not necessarily, incorporated into a packaging system or receptacle. The packaging receptacle or container may be rigid or flexible, and include any material suitable for containing the compositions produced, as for example glass, metal, plastic film or sheet, cardboard, cardboard composites, paper, or the like. Rinse aid compositions may be allowed to solidify in the packaging or may be packaged after formation of the solids in commonly available packaging and sent to distribution center before shipment to the consumer.

For solids, advantageously, in at least some embodiments, since the rinse is processed at or near ambient temperatures, the temperature of the processed mixture is low enough so that the mixture may be cast or extruded directly into the container or other packaging system without structurally damaging the material. As a result, a wider variety of materials may be used to manufacture the container than those used for compositions that processed and dispensed under molten conditions. In some embodiments, the packaging used to contain the rinse aid is manufactured from a flexible, easy opening film material.

Dispensing/Use of the Rinse Aid

The rinse aid can be dispensed as a concentrate or as a use solution. In addition, the rinse aid concentrate can be provided in a solid form or in a liquid form. In general, it is expected that the concentrate will be diluted with water to provide the use solution that is then supplied to the surface of a substrate. In some embodiments, the aqueous use solution may contain about 2,000 parts per million (ppm) or less active materials, or about 1,000 ppm or less active material, or in the range of about 10 ppm to about 500 ppm of active materials, or in the range of about 10 to about 300 ppm, or in the range of about 10 to 200 ppm.

The use solution can be applied to the substrate during a rinse application, for example, during a rinse cycle, for example, in a warewashing machine, a car wash application, institutional healthcare surface cleaning or the like. In some embodiments, formation of a use solution can occur from a rinse agent installed in a cleaning machine, for example onto a dish rack. The rinse agent can be diluted and dispensed from a dispenser mounted on or in the machine or from a separate dispenser that is mounted separately but cooperatively with the dish machine.

For example, in some embodiments, liquid rinse agents can be dispensed by incorporating compatible packaging containing the liquid material into a dispenser adapted to diluting the liquid with water to a final use concentration. Some examples of dispensers for the liquid rinse agent of the invention are DRYMASTER-P sold by Ecolab Inc., St. Paul, Minn.

In other example embodiments, solid products may be conveniently dispensed by inserting a solid material in a container or with no enclosure into a spray-type dispenser such as the volume SOL-ET controlled ECOTEMP Rinse Injection Cylinder system manufactured by Ecolab Inc., St. Paul, Minn. Such a dispenser cooperates with a washing machine in the rinse cycle. When demanded by the machine, the dispenser directs water onto the solid block of rinse agent which effectively dissolves a portion of the block creating a concentrated aqueous rinse solution which is then fed directly into the rinse water forming the aqueous rinse. The aqueous rinse is then contacted with the surfaces to affect a complete rinse. This dispenser and other similar dispensers are capable of controlling the effective concentration of the active portion in the aqueous rinse by measuring the volume of material dispensed, the actual concentration of the material in the rinse water (an electrolyte measured with an electrode) or by measuring the time of the spray on the cast block. In general, the concentration of active portion in the aqueous rinse is preferably the same as identified above for liquid rinse agents. Some other embodiments of spray-type dispenser are disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. An example of a particular product shape is shown in FIG. 9 of U.S. Pat. No. 6,258,765, which is incorporated herein by reference.

The composition of the invention is particularly beneficial for use with hard water. The composition can provide good rinsing and levels up to 20 gpg water hardness.

In some embodiments, it is believed that the rinse aid composition of the invention can be used in a high solids containing water environment in order to reduce the appearance of a visible film caused by the level of dissolved solids provided in the water. In general, high solids containing water is considered to be water having a total dissolved solids (TDS) content in excess of 200 ppm. In certain localities, the service water contains total dissolved solids content in excess of 400 ppm, and even in excess of 800 ppm. The applications where the presence of a visible film after washing a substrate is a particular problem includes the restaurant or warewashing industry, the car wash industry, the healthcare instrument reprocessing and cart washing sections, and the general cleaning of hard surfaces.

When used in these automated washing applications such as ware washers and healthcare instrument and cart washers, the rinse aid should provide effective sheeting action and low foaming properties. It is believed that the rinse aid composition of this invention is adventurously formulated to control the issues mentioned above Methods and Compositions for Cleaning, Rinsing, and Antimicrobial Treatment of Medical Carts, Cages, Instruments, or Devices The present methods and solid rinse aid compositions may be used for cleaning a medical cart, cage, instrument, or device in a medical or health care environment. Typically, cleaning a medical cart, cage, instrument, or device includes contacting the medical cart, cage, instrument, or device with an aqueous cleaning composition and then according to the invention, rinsing or contacting the same with a rinse solution comprising a dissolved rinse aid of the invention. The method can also involve antimicrobial treatment of the medical cart, cage, instrument, or device by contacting with an aqueous antimicrobial composition formed by dissolving or suspending a solid antimicrobial composition, preferably a solid quaternary ammonium or solid halogen antimicrobial composition.

Contacting with a cleaning composition can take place through manual application in a wash area or bay or through application by cart, cage, instrument, or device washing apparatus. In a manual method rinsing and/or antimicrobial treatment can also take place in the wash area or bay, or in a separate area or bay. A typical cart, cage, instrument, or device washing apparatus includes a wash station which applies the cleaning composition. Typically such a washing apparatus also includes a rinse station that can rinse the cart, cage, instrument, or device with water or another suitable rinse composition, such as a solid neutral or neutralizing rinse composition. Such a washing apparatus can also, optionally, include an antimicrobial treatment station that can contact the cart, cage, instrument, or device with a dissolved solid antimicrobial composition, such as a solid quaternary ammonium or solid halogen antimicrobial composition. A washing apparatus can conduct one or more of washing, rinsing, and/or antimicrobial treatment of steps at one, two, three, or more stations.

The present methods and compositions for rinsing a medical cart, cage, instrument, or device can be employed for rinsing a medical cart, cage, instrument, or device made of a variety of materials in a medical or health care environment. Typically, rinsing a medical cart, cage, instrument, or device includes rinsing the medical cart, cage, instrument, or device using an aqueous rinse composition formed by dissolving or suspending the solid rinse composition of the invention.

Contacting with a rinsing composition can take place through manual application in a rinse area or bay or through application by cart, cage, instrument, or device washing and/or rinsing apparatus. In a manual method cleaning and/or antimicrobial treatment can also take place in the rinse area or bay, or in a separate area or bay. A typical cart, cage, instrument, or device washing apparatus includes a rinse station that can rinse the cart, cage, instrument, or device with a liquid rinse composition formed from a solid neutral or neutralizing rinse composition. Such a washing apparatus can also, optionally, include a washing and/or antimicrobial treatment station.

The antimicrobial composition employed either for manual or machine medical cart, cage, instrument, or device antimicrobial treatment can be a solid antimicrobial composition, preferably a solid quaternary ammonium or solid halogen antimicrobial composition, which is described in greater detail herein below.

Methods for Medical Cart Cleaning

Medical cart cleaning can be accomplished either manually or with a machine. Manual medical cart cleaning can include preparing a use composition of a solid cleaning composition and applying it to the medical cart. Applying typically includes wiping or scrubbing the medical cart with a brush, a towel, or a sponge soaked with the cleaning composition. Applying can also include spraying the cart with the use composition. Manual medical cart cleaning can also include preparing a use composition of a rinse composition, preferably a neutral rinse composition, and applying it to the medical cart. Applying a rinse composition can include spraying, pouring, or wiping the use composition onto the cart. Manual medical cart cleaning can also include preparing a use composition of a solid antimicrobial composition, preferably a solid quaternary ammonium or solid halogen antimicrobial composition, and applying it to the medical cart. Applying an antimicrobial composition can include spraying, pouring, or wiping the use composition onto the cart. Drying the medical cart, either manually or air drying, typically follows rinsing.

Machine cleaning of a medical cart can employ any of a variety of configurations of medical cart cleaning apparatus. Such apparatus can be adapted to dispense the solid detergent, rinse aid composition of the invention and/or antimicrobial composition. A medical cart cleaning apparatus typically includes at least one chamber that houses the medical cart during washing, rinsing, and/or antimicrobial treatment.

Smaller medical cart cleaning apparatus typically include a single chamber sized to house, for example, 1-3 medical carts. Medical carts can be introduced into the smaller apparatus by an operator through a door or other coverable opening in the chamber. The apparatus then subjects the carts in the chamber to one or more of washing, rinsing, antimicrobial treatment, and/or drying cycles. Washing typically occurs by spraying the medical cart with a use wash composition. Rinsing typically occurs by spraying the medical cart with a use rinse composition. Optionally, antimicrobial treatment can occur by spraying the medical cart with a use antimicrobial composition. Drying can occur by blowing ambient or heated air, or by treating with steam. Medical carts can be removed from the chamber by an operator through the same door or other coverable opening or through an exit door or other coverable opening on an opposite side of the apparatus.

Larger medical cart cleaning apparatus typically includes a transport apparatus that transports one or several carts through one or more chambers including washing, rinsing, optionally antimicrobial treatment, and/or drying stations. Such a medical cart cleaning apparatus can resemble a touchless car wash sized and configured for cleaning medical carts instead of cars. Typically the cart is transported through the washing, rinsing, optional antimicrobial treatment, and/or drying stations by a track or rail apparatus while tipped at an acute angle from the horizontal, with its doors (if any) open. This tipping can keep the doors open and allow liquid to drain off any normally horizontal surfaces of the medical cart. The entry to a larger medical cart cleaning apparatus can be covered, for example, by a door or with hanging plastic strips that allow entry of carts but that retain use compositions in the apparatus. The wash station typically sprays the medical cart with use wash composition. A rinse station typically sprays the medical cart with use rinse composition. An optional antimicrobial treatment station typically sprays the medical cart with use antimicrobial composition. At the drying station, blowers blow ambient or heated air on the cart, or the cart is steam treated. Alternatively, the cart can be removed from the apparatus and towel dried. One or more stations can be at different, overlapping, or the same locations. The exit from the apparatus can be covered in the same manner as the entrance.

Mechanical cart washers can employ up to about 30 to about 40 gallons of use composition of cleaning composition per wash cycle, up to about 30 to about 40 gallons of use composition rinse composition per rinse cycle, and, optionally, up to about 30 to about 40 gallons of use antimicrobial composition per antimicrobial treatment cycle. The actual amount of cleaning, rinsing, or antimicrobial composition used will be based on the judgment of the user, and will depend upon factors such as the particular product formulation of the composition, the concentration of the composition, the number of soiled carts to be cleaned and the degree of soiling of the carts.

A machine that washes medical carts can also be employed to wash other wheeled medical equipment or supplies such as wheel chairs, wheeled stands, such as those that hold intravenous bags, tubes and pumps, wheeled (metro) shelves, and the like.

The above description provides a basis for understanding the broad meets and bounds of the invention. The following examples and test data provide an understanding of certain specific embodiments of the invention. These examples are not meant to limit the scope of the invention. Unless otherwise noted, all parts, percentages, and ratios reported in the following examples are on a weight basis, and all reagents used in the examples were obtained, or are available, from the chemical suppliers described below, or may be synthesized by conventional techniques.

EXAMPLES

The following materials are used in the examples that follow:

Plurafac SLF-180: Fatty alcohol alkoxylate

Dehypon GRA: Fatty alcohol alkoxylate

Kathon—preservative available from Dow Chemical with active ingredient 5-chloro-2-methyl-4-isothiazolin-3-one and 2-methyl-4-isothiazolin-3-one Sodium Xylene Sulfonate Citric acid Control is Water (0 or 17 gpg depending on experimental purpose).

Commercial Rinse aid A is a commercially available rinse aid from Steris.

Commercial Rinse aid B is a commercially available rinse aid from Getinge that includes phosphoric acid.

Commercial Rinse aid C is a commercially available liquid rinse aid from Ecolab.

Commercial rinse aid D is a commercially available solid rinse aid from Ecolab that does not include any hardness or TDS components.

Compositions of the invention were formulated per below and tested.

| Name | Composition of the Invention A Wt % | Composition of the Invention B Wt % |
|---|---|---|
| Water Deionized | 0.5 | 0.5 |
| dye | 0.15 | 0.15 |
| Kathon GC-ICP Preservative | 1.4 | 1.4 |
| Plurafac SLF-180 | 13.1 | 7.1 |
| Sodium Xylene Sulfonate 96% | 69.85 | 69.85 |
| Citric Acid, USP, Anhydrous Grade | 15 | 15 |
| Dehypon GRA | | 6 |

Example 1

A hardness test was performed with Commercially available rinse aids and compositions of the invention per the methodology below.

Hardness Test (17 Grain Water)

Stainless Steel 304

&

Glass Microscope Slide

1. Obtain 15 of each coupon: stainless steel 304 #4 finish and glass (microscope slides).
2. Wash each coupon thoroughly with a soft sponge and Pantastic®. Rinse with 5 grain water and DI water. Lay flat and let dry over night.
3. Obtain 30 8 oz glass French square vials.
4. Rinse each vial with 5 grain water and DI water, lay flat and let dry over night.
5. Prepare the following Chemistries:

| Sample | Description | | Water condition |
|---|---|---|---|
| 1 | control | | 17 gpg |
| 2 | Commercial rinse aid A | 2000 ppm | 17 gpg |
| 3 | Commercial rinse aid B | 2000 ppm | 17 gpg |
| 4 | Commercial Rinse aid C | 500 ppm | 17 gpg |
| 5 | Commercial Rinse aid C | 1000 ppm | 17 gpg |
| 6 | Commercial Rinse aid C | 2000 ppm | 17 gpg |
| 7 | Commercial Rinse aid D | 50 ppm | 17 gpg |
| 8 | Commercial Rinse aid D | 125 ppm | 17 gpg |
| 9 | Commercial Rinse aid D | 200 ppm | 17 gpg |
| 10 | Composition of the Invention A | 50 ppm | 17 gpg |
| 11 | Composition of the Invention A | 125 ppm | 17 gpg |
| 12 | Composition of the Invention A | 200 ppm | 17 gpg |
| 13 | Composition of the Invention B | 50 ppm | 17 gpg |
| 14 | Composition of the Invention B | 125 ppm | 17 gpg |
| 15 | Composition of the Invention B | 200 ppm | 17 gpg |

6. To 2 separate glass French square vials 200 mL of control (17 grain water) was added along with surfaces; stainless steel 304 #4 finish and glass microscope slide in each separate vial. The vials were labeled.
7. Step 6 was repeated for all chemistries with 17 grain water.
8. All of the vials were put in a 70° C. temperature controlled oven and allowed to incubate for 8 hours.

Results are shown in FIG. 1. As can be seen, From the Image analysis means, one can see that the Compositions of the invention outperform the other rinse aid products.

Example 2

Next the performance of the different rinse aids was tested in different levels of total dissolved solids per the methodology below.

Total Dissolve Solids (1000 ppm NaCl in 0 Grain Water)

Stainless Steel 304 #4 Finish

1. Before beginning the dip tester was pre-heated to 150° F.
2. Obtain 15 of each coupon: stainless steel 304 #4 finish (3×5 in).
3. Wash each coupon thoroughly with a soft sponge and Pantastic®. Rinse with 5 grain water and DI water. Lay flat and let dry over night.
4. Prepare the following Chemistries in a 1 L beaker:

| Sample | Description | | NaCl |
|---|---|---|---|
| 1 | control | | 1000 ppm |
| 2 | Commercial Rinse aid A | 2000 ppm | 1000 ppm |
| 3 | Commercial Rinse aid B | 2000 ppm | 1000 ppm |
| 4 | Commercial Rinse aid C | 500 ppm | 1000 ppm |
| 5 | Commercial Rinse aid C | 1000 ppm | 1000 ppm |
| 6 | Commercial Rinse aid C | 2000 ppm | 1000 ppm |
| 7 | Commercial Rinse aid D | 50 ppm | 1000 ppm |
| 8 | Commercial Rinse aid D | 125 ppm | 1000 ppm |
| 9 | Commercial Rinse aid D | 200 ppm | 1000 ppm |
| 10 | Composition of the Invention A | 50 ppm | 1000 ppm |
| 11 | Composition of the Invention A | 125 ppm | 1000 ppm |
| 12 | Composition of the Invention A | 200 ppm | 1000 ppm |
| 13 | Composition of the Invention B | 50 ppm | 1000 ppm |
| 14 | Composition of the Invention B | 125 ppm | 1000 ppm |
| 15 | Composition of the Invention B | 200 ppm | 1000 ppm |

5. To the 1 L beaker 1000 mL of control (0 grain water+1000 ppm NaCl) was added; the beaker was placed in a microwave and heated to 150° F. The beaker was then placed in a dip tester water bath (water temperature set at 150 F).
6. Set the dip tester to have the coupon in solution for 1 minute static soak.
7. After one minute when the coupon comes out of solution and the plank has risen all the way, the coupons are suspended in air for 2 minutes.
8. After 2 minutes, the coupon is removed from the dip tester and set on a rack in the vertical position to cool down to room temperature.
9. Steps 4-7 were repeated for all chemistries with 0 grain water.

Figure 2:
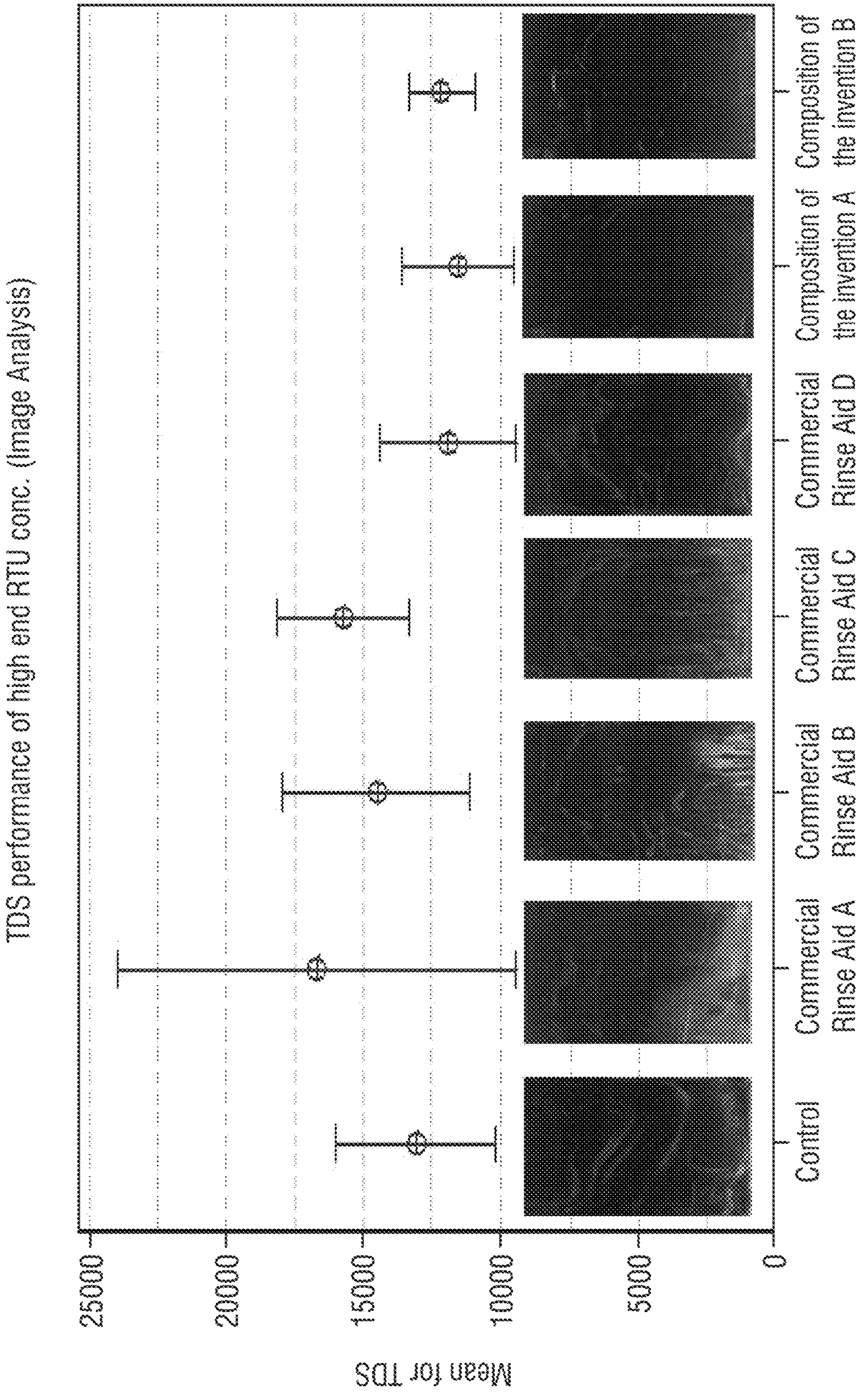
FIG. 2 is a graph showing the total dissolved solids (TDS) performance of compositions of the invention A and B and different commercial rinse aids A-D.

The results are shown in FIG. 2. One can see that the compositions of the invention outperform all other rinse at with increased levels of total dissolved solids in the rinse water.

Example 3

Material Corrosion/Compatibility Test (0 Grain Water)

1. Obtain coupons of desired substrate material (Aluminum).
2. Wash each coupon thoroughly with a soft sponge and Commercially available detergent. Rinse with 0 grain water and DI water. Lay flat and let dry over night.
3. Obtain 8 oz glass French square vials.
4. Rinse each vial with 0 grain water and DI water, lay flat and let dry over night.
5. Prepare the following Chemistries:

| Description | corrosion Study 0 gpg |
|---|---|
| Control: 0 gpg Water | |
| Commercial Rinse aid A | 2000 ppm |
| Commercial Rinse aid B | 2000 ppm |
| Commercial Rinse aid C | 500 ppm |
| Commercial Rinse aid C | 1000 ppm |
| Commercial Rinse aid C | 2000 ppm |
| Commercial Rinse aid D | 50 ppm |
| Commercial Rinse aid D | 125 ppm |
| Commercial Rinse aid D | 200 ppm |
| Composition of the Invention A | 50 ppm |
| Composition of the Invention A | 125 ppm |
| Composition of the Invention A | 200 ppm |
| Composition of the Invention B | 50 ppm |
| Composition of the Invention B | 125 ppm |
| Composition of the Invention B | 200 ppm |

6. To 2 separate glass French square vials 200 mL of control (0 grain water) was added along with coupons with material to be studied; example: aluminum 6061 and aluminum 1100. The vials were labeled.
7. Step 6 was repeated for every chemistry with 0 grain water.
8. All of the vials were put in the 160° F. oven and allowed to incubate for 8 hours.
9. Coupons were removed from each test solution with a clean tweezers.
10. Inductively coupled plasma (ICP) spectroscopy was used to analyze Al concentration in each test solution respectively.

Figure 3:
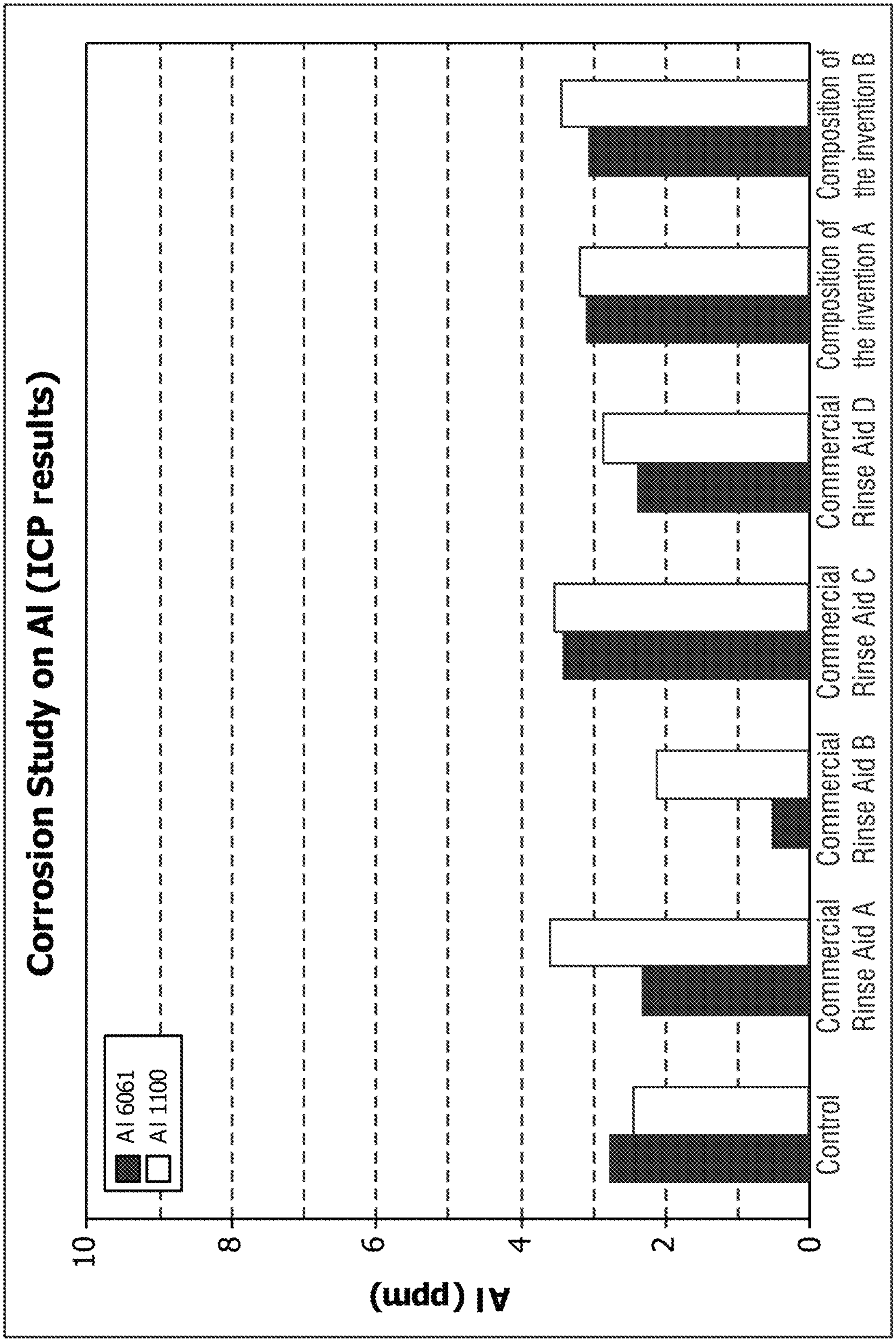
FIG. 3 is a graph showing the metal compatibility data of compositions of the invention A and B and different commercial rinse aids A-D.

FIG. 3 shows the results for the Al coupon and one can see that the compositions of the invention demonstrated very little corrosion. Other metal coupons tested showed that the formulations of the invention are compatible with all metals.

Example 4

The foaming tendency at use was tested on Sump solutions per below.

The Inversion foam test is used to simulate Sump solution agitation. Rinse additive is added to the graduated cylinder, and the foam generated is measured after 10 180° inversions.

Apparatus and Materials:

1. 250 mL Graduated Cylinder with stopper.
2. Room temperature 5 grain water.

| Description | 0 gpg Shake Test | |
|---|---|---|
| Commercial Rinse aid A | Liquid product; N/A | |
| Commercial Rinse aid B | Liquid product; N/A | |
| Commercial Rinse aid C | Liquid product; N/A | |
| Commercial Rinse aid D | 5% | 10% |
| Composition of the Invention A | 5% | 10% |
| Composition of the Invention B | 5% | 10% |

Procedure:

1. Rinse the graduated cylinder thoroughly with soft water, followed by DI water and air dry.
2. Prepare desired 5% and/or 10% simulated sump solution of solid rinse aids, stir until dissolved.

3. Pour 150 mL of the 5% or 10% solution or the as is liquid commercial rinse aids into the graduated cylinder and cap with a stopper.
4. From a vertical position, rotate the cylinder about 180° and back to the vertical position.
5. Repeat this action 10 times at a frequency of about 1 cycle/second.
6. The foam height was immediately recorded when the cylinder was placed on the flat surface. Read the foam height as the difference between the top of the liquid level to the top of the foam level. The top of the foam level is the level at which the foam is opaque and the operator cannot see through the cylinder.
7. Repeat for each chemistry.

Figure 4:
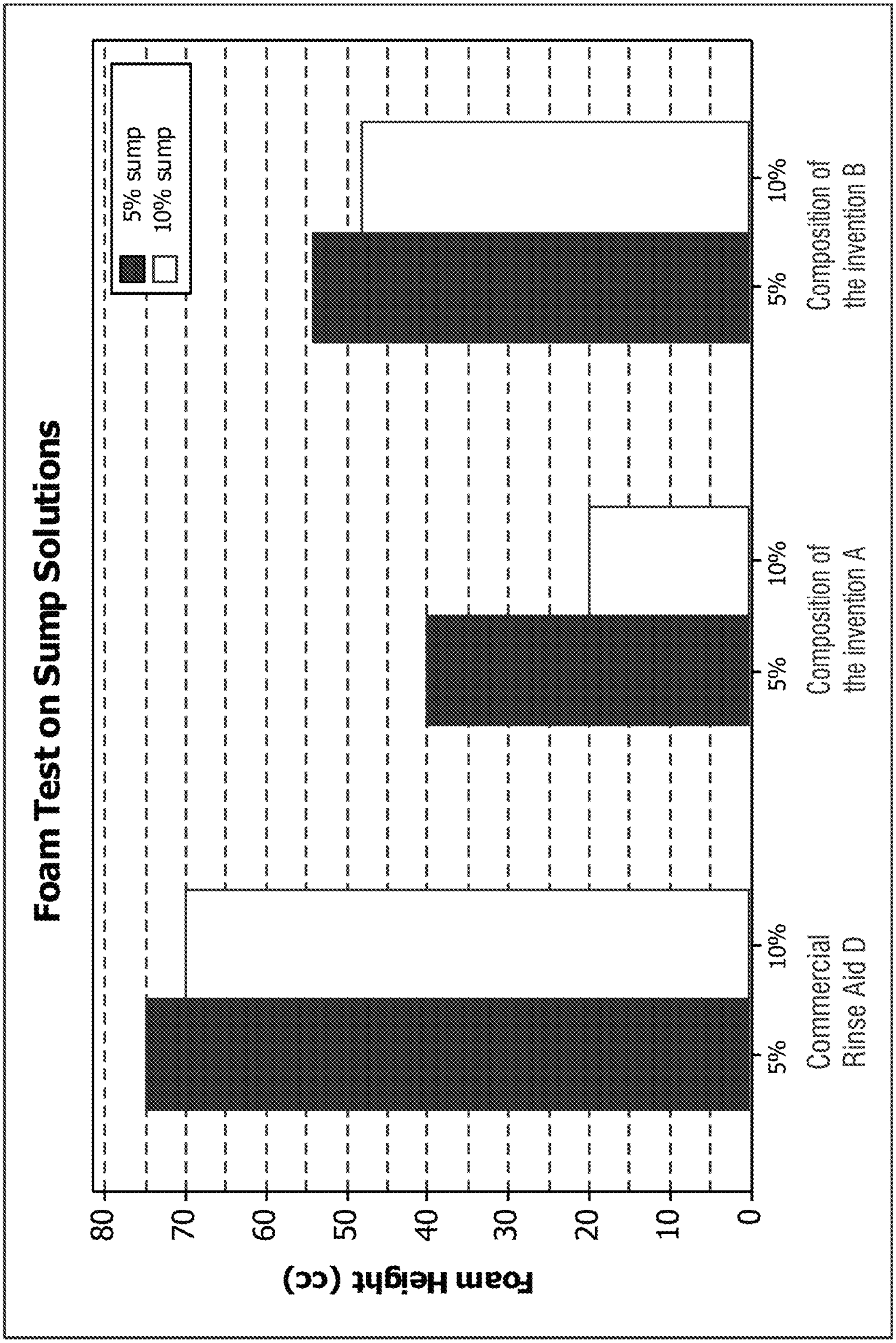
FIG. 4 is a graph showing the foam height of compositions of the invention A and B and different commercial rinse aid D at dispenser sump concentration using Glewwe Foam Apparatus.

The results are shown in FIG. 4 and here again the formulations of the invention demonstrated better foam control.

OTHER EMBODIMENTS

It is to be understood that while the invention has been described in conjunction with the detailed description thereof, the foregoing description is intended to illustrate, and not limit the scope of the invention, which is defined by the scope of the appended claims. Other aspects, advantages, and modifications are within the scope of the following claims.

In addition, the contents of all patent publications discussed supra are incorporated in their entirety by this reference.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

Example 5

Finally, the following procedure was used to evaluate the foaming tendency of the different rinse additives at use concentrations.

Foam Rinse Additive Evaluation

Apparatus and Materials:

1. Glewwe Foam apparatus.
2. Hot soft water.
3. Small and large weigh boats

Procedure:

1. Rinse the Glewwe apparatus thoroughly by filling it with soft water and running the pump. Drain the apparatus by opening the gate valve. If foam is generated during this cleaning, repeat the procedure until it is not.
2. Close the gate valve and remove the top lid.
3. Fill the chimney with hot soft water to the base of the ruler, 0", 3 L of water.
4. Turn on the pump switch and adjust the temperature to 100, 120, 140 or 160° F. by adding either cold or hot soft water. Tests were run at 160 F.
5. Adjust the pressure to 6 psi by using the knob located below the pressure gauge. Stop the pump.
6. Re-adjust the water level to 0" as required.
7. Turn on the pump, allow the pressure to reach 6 psi, and add desired concentration of the rinse additive or surfactant combination to be evaluated. Note the time.
8. After 1 minute, stop the pump and record the foam height and characteristics at time zero, 15 seconds and 1 minute.
9. Open the gate valve to drain the machine and repeat the cleaning procedure.

UNSTABLE—foam breaks rapidly (less than 15 seconds)

PARTIALLY STABLE—foam breaks slowly (within a minute)

STABLE—foam remains for several minutes

| | | | Glewwe Foam test at 160 F. (in) 0 gpg | | |
|---|---|---|---|---|---|
| Sample | Description | | initial | 15 s | 1 min |
| 1 | control | | | | |
| 2 | Commercial Rinse aid A | 2000 ppm | | | |
| 3 | Commercial Rinse aid B | 2000 ppm | | | |
| 4 | Commercial Rinse aid C | 500 ppm | | | |
| 5 | Commercial Rinse aid C | 1000 ppm | | | |
| 6 | Commercial Rinse aid C | 2000 ppm | | | |
| 7 | Commercial Rinse aid D | 50 ppm | | | |
| 8 | Commercial Rinse aid D | 125 ppm | | | |
| 9 | Commercial Rinse aid D | 200 ppm | | | |
| 10 | Composition of the Invention A | 50 ppm | | | |
| 11 | Composition of the Invention A | 125 ppm | | | |
| 12 | Composition of the Invention A | 200 ppm | | | |
| 13 | Composition of the Invention B | 50 ppm | | | |
| 14 | Composition of the Invention B | 125 ppm | | | |
| 15 | Composition of the Invention B | 200 ppm | | | |

Figure 5:
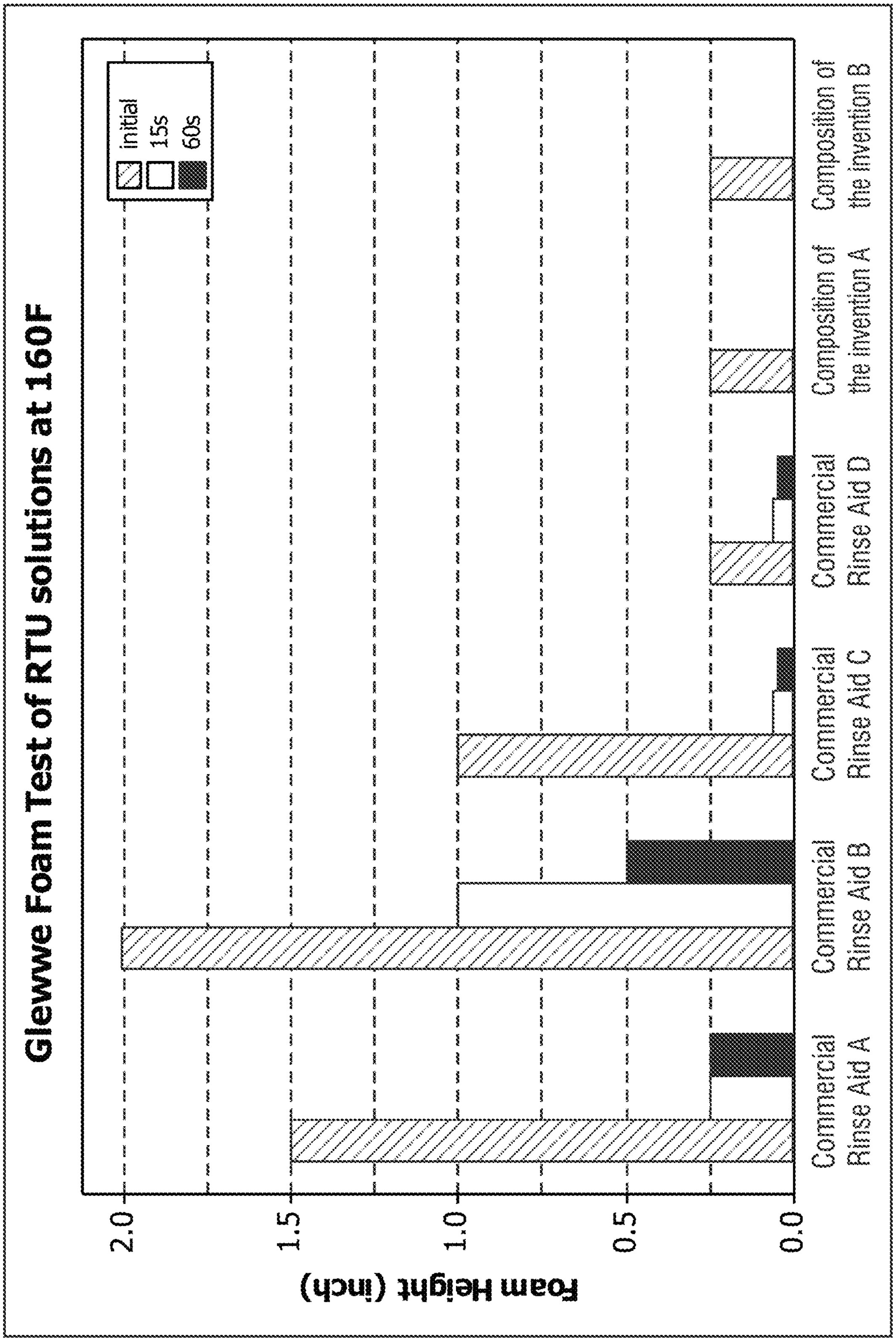
FIG. 5 is a graph showing foam height of compositions of the invention A and B and different commercial rinse aids A-D at RTU concentration

The results are shown in FIG. 5. The figures shows that the foam profile at dispenser pump concentration are better than the controls. Foam control is a very important aspect of rinse aids.

The invention claimed is:

1. A solid rinse aid composition comprising:

from about 25 wt. % to about 40 wt. % of a solid acid, wherein the solid acid includes one or more of lactic acid, gluconic acid, citric acid, tartaric acid, phosphoric acid, maleic acid, aspartic acid, and mixtures thereof;

from about 55 wt. % to 80 wt. % of one or more short chain alkyl benzene and/or alkyl naphthalene sulfonates;

and one or more nonionic surfactants; wherein said solid rinse aid composition provides a use solution with a pH of less than 2.

2. The solid rinse aid composition of claim 1 wherein said short chain alkyl benzene and/or alkyl naphthalene sulfonate is one or more of the following: sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butylnaphthalene sulfonate.

3. The solid rinse aid of claim 2 wherein said short chain alkyl benzene and/or alkyl naphthalene sulfonate is sodium xylene sulfonate.

4. The solid rinse aid composition of claim 1 wherein said short chain alkyl benzene and/or alkyl naphthalene sulfonates are present in an amount of from about 40 wt. % to about 85 wt. %.

5. The solid rinse aid composition of claim 1 wherein said short chain alkyl benzene and/or alkyl naphthalene sulfonates are present in an amount of from about 40 wt. % to about 80 wt. %.

6. The solid rinse aid composition of claim 1 wherein said nonionic surfactant is one or more of fatty alcohol alkoxylates, capped alcohol alkoxylates, or polyoxypropylene-polyoxyethylene block polymers based upon propylene glycol, ethylene glycol, glycerol, trimethylolpropane, and ethylenediamine.

7. The solid rinse aid composition of claim 1 wherein said nonionic surfactant is a low foaming nonionic surfactant.

8. The solid rinse aid composition of claim 7 wherein said low foaming surfactant is present in an amount of from about 10 wt. % to about 30 wt. %.

9. The solid rinse aid composition of claim 1 further comprising from 0.05 wt. % to about 20 wt. % of a preservative.

10. The solid rinse aid composition of claim 1 further comprising from 0.1 wt. % to about 30 wt. % of a chelant.

11. The solid rinse aid of claim 1 wherein said acid is citric acid.

12. The solid rinse aid composition of claim 1 wherein said solid acid is present in an amount of from about 10 wt. % to about 25 wt. %.

13. A use solution of comprising the solid rinse aid composition of claim 1 admixed with water so that said solution comprises about 2,000 ppm or less active materials.

14. The use solution of claim 13 wherein said use solution comprises about 1000 ppm or less of active material.

15. The use solution of claim 14 wherein said use solution comprises from about 10 ppm to about 500 ppm of active materials.

* * * * *